United States Patent
Zhou

(10) Patent No.: US 11,606,573 B2
(45) Date of Patent: *Mar. 14, 2023

(54) INTER-PREDICTION CANDIDATE INDEX CODING INDEPENDENT OF INTER-PREDICTION CANDIDATE LIST CONSTRUCTION IN VIDEO CODING

(71) Applicant: TEXAS INSTRUMENTS INCORPORATED, Dallas, TX (US)

(72) Inventor: Minhua Zhou, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/243,638

(22) Filed: Apr. 29, 2021

(65) Prior Publication Data
US 2021/0250601 A1    Aug. 12, 2021

Related U.S. Application Data

(63) Continuation of application No. 16/839,284, filed on Apr. 3, 2020, now Pat. No. 11,025,941, which is a
(Continued)

(51) Int. Cl.
*H04N 19/00* (2014.01)
*H04N 19/463* (2014.01)
(Continued)

(52) U.S. Cl.
CPC ......... *H04N 19/463* (2014.11); *H04N 19/109* (2014.11); *H04N 19/50* (2014.11); *H04N 19/176* (2014.11); *H04N 19/625* (2014.11)

(58) Field of Classification Search
CPC .... H04N 19/50; H04N 19/176; H04N 19/625; H04N 19/463; H04N 19/109
See application file for complete search history.

(56) References Cited

U.S. PATENT DOCUMENTS

| 2012/0195368 A1* | 8/2012 | Chien | H04N 19/51 375/240.02 |
| 2012/0219063 A1* | 8/2012 | Kim | H04N 19/46 375/240.16 |

(Continued)

FOREIGN PATENT DOCUMENTS

WO    WO 2011021915    2/2011

OTHER PUBLICATIONS

Thomas Wiegand et al, "WD3: Working Draft 3 of High-Efficiency Video Coding", JCTVC-E603, Mar. 16-23, 2011, pp. 1-215, Joint Collaborative Team on Video Coding (JCT-VC) of ITU-T SG16 WP3 and ISO/IEC JTC1/SC29/WG11, Geneva, Switzerland.

(Continued)

*Primary Examiner* — Zhihan Zhou
(74) *Attorney, Agent, or Firm* — Carl G. Peterson; Frank D Cimino

(57) ABSTRACT

Methods are provided for inter-prediction candidate index coding independent of the construction of the corresponding inter-prediction candidate list, i.e., a merging candidate list or an advanced motion vector predictor list. A maximum allowed number of inter-prediction candidates for an inter-prediction candidate list is used for encoding the inter-prediction candidate index in an encoded bit stream. The maximum allowed number may be pre-determined or may be selected by the encoder and encoded in the bit stream. A decoder may then decode the index using the maximum allowed number of inter-prediction candidates independent of the construction of the corresponding inter-prediction candidate list.

13 Claims, 10 Drawing Sheets

Related U.S. Application Data continuation of application No. 16/384,750, filed on Apr. 15, 2019, now Pat. No. 10,638,149, which is a continuation of application No. 15/864,952, filed on Jan. 8, 2018, now Pat. No. 10,264,275, which is a continuation of application No. 13/523,772, filed on Jun. 14, 2012, now Pat. No. 9,866,859, which is a continuation-in-part of application No. 13/421,519, filed on Mar. 15, 2012, now abandoned.

(60) Provisional application No. 61/504,404, filed on Jul. 5, 2011, provisional application No. 61/501,441, filed on Jun. 27, 2011, provisional application No. 61/496,934, filed on Jun. 14, 2011.

(51) Int. Cl.
*H04N 19/50* (2014.01)
*H04N 19/109* (2014.01)
*H04N 19/176* (2014.01)
*H04N 19/625* (2014.01)

(56) References Cited

U.S. PATENT DOCUMENTS

| | | | | |
|---|---|---|---|---|
| 2012/0263235 A1* | 10/2012 | Sugio | H04N 19/503 | 375/240.16 |
| 2012/0300846 A1* | 11/2012 | Sugio | H04N 19/577 | 375/240.16 |
| 2012/0307902 A1* | 12/2012 | Sugio | H04N 19/56 | 375/240.16 |
| 2012/0307903 A1* | 12/2012 | Sugio | H04N 19/105 | 375/240.16 |
| 2012/0328021 A1* | 12/2012 | Sugio | H04N 19/105 | 375/240.16 |
| 2013/0010869 A1* | 1/2013 | Sugio | H04N 19/176 | 375/240.16 |

OTHER PUBLICATIONS

Minhua Zhou et al, "A Study of HM3.0 Parsing Throughput Issue", JCTVC-F068, Jul. 14-22, 2011, pp. 1-22, Joint Collaborative Team on Video Coding (JCT-VC) of ITU-T SG16 WP3 and ISO/IEC JTC1/SC29/WG11, Torino, Italy.

Minhua Zhou et al, "A Study of HM3.0 Parsing Throughput Issue", JCTVC-F068 presentation, Joint Collaborative Team on Video Coding (JCT-VC) of ITU-T SG16 WP3 and ISO/IEC JTC1/SC29/WG11, Torino, Italy.

Minhua Zhou and Vivienne Sze, "A Study on HM2.0 Bitstream Parsing and Error Resiliency Issue", JCTVC-E0118, Mar. 16-23, 2011, pp. 1-8, Joint Collaborative Team on Video Coding (JCT-VC) of ITU-T, G16 WP3 and ISO/IEC JTC1/SC29/WG11, Geneva, Switzerland.

Minhua Zhou and Vivienne Sze, "A Study on HM2.0 Bitstream Parsing and Error Resiliency Issue", JVTVC-E118 presentation, Mar. 16-23, 2011, pp. 1-12, Joint Collaborative Team on Video Coding (JCT-VC) of ITU-T, G16 WP3 and ISO/IEC JTC1/SC29/WG11, Geneva, Switzedand.

Benjamin Bross et al., "WD5: Working Draft 5 of High-Efficiency Video Coding", JCTVC-G1103_d9, Nov. 21-30, 2011, pp. 1-237, Joint Collaborative Team on Video Coding (JCT-VC) of ITU-T SG16 WP3 and ISO/IEC JTC1/SC29/WG11, Geneva, Switzedand.

Toshiyasu Sugio and Takahiro Nishi, "Parsing Robustness for Merge/AMVP", JCTVC-F470, Jul. 14-22, 2011, pp. 1-33, Joint Collaborative Team on Video Coding (JCT-VC) of ITU-T SG16 WP3 and ISO/IEC JTC1/SC29/WG11, Torino, Italy.

Benjamin Bross et al, "High Efficiency Video Coding (HEVC) Text Specification Draft 7," JCTVC-I1003_d0, Apr. 27-May 7, 2012, pp. 1-270, Joint Collaborative Team on Video Coding (JCT-VC) of ITU-T SG16 WP3 and ISO/IEC JTC1/SC29/WG11, Geneva, Switzedand.

Benjamin Bross et al, High Efficiency Video Coding (HEVC) Text Specification Draft 6, JCTVC-H1003, Nov. 21-30, 2011, pp. 1-259, Joint Collaborative Team on Video Coding (JCT-VC) of ITU-T SG16 WP3 and ISO/IEC JTC1/SC29/WG11, Geneva, Switzedand.

Benjamin Bross et al, "WD4: Working Draft 4 of High-Efficiency Video Coding", JCTVC-F803_d6, Jul. 14-22, 2011, pp. 1-229, Joint Collaborative Team on Video Coding (JCT-VC) of ITU-T SG16 WP3 and ISO/IEC JTC1/SC29/WG11, Torino, Italy.

Minhua Zhou et al, "A Method of Decoupling Motion Data Reconstruction from Entropy Decoding", JCTVC-F347, Jul. 14-22, 2011, pp. 1-20, Joint Collaborative Team on Video Coding (JCT-VC) of ITU-T, G16 WP3 and ISO/IEC JTC1/SC29/WG11, Torino, Italy.

Minhua Zhou et al, "A Method of Decoupling Motion Data Reconstruction from Entropy Decoding", JCTVC-F347 presentation, Jul. 14-22, 2011, pp. 1-11, Joint Collaborative Team on Video Coding (JCT-VC) of ITU-T, G16 WP3 and ISO/IEC JTC1/SC29/WG11, Torino, Italy.

* cited by examiner

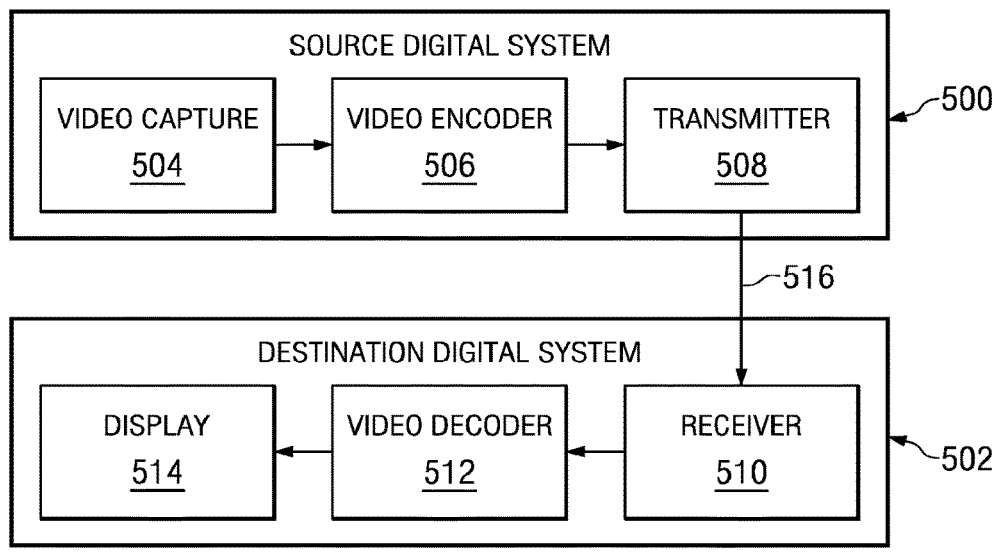
FIG. 5
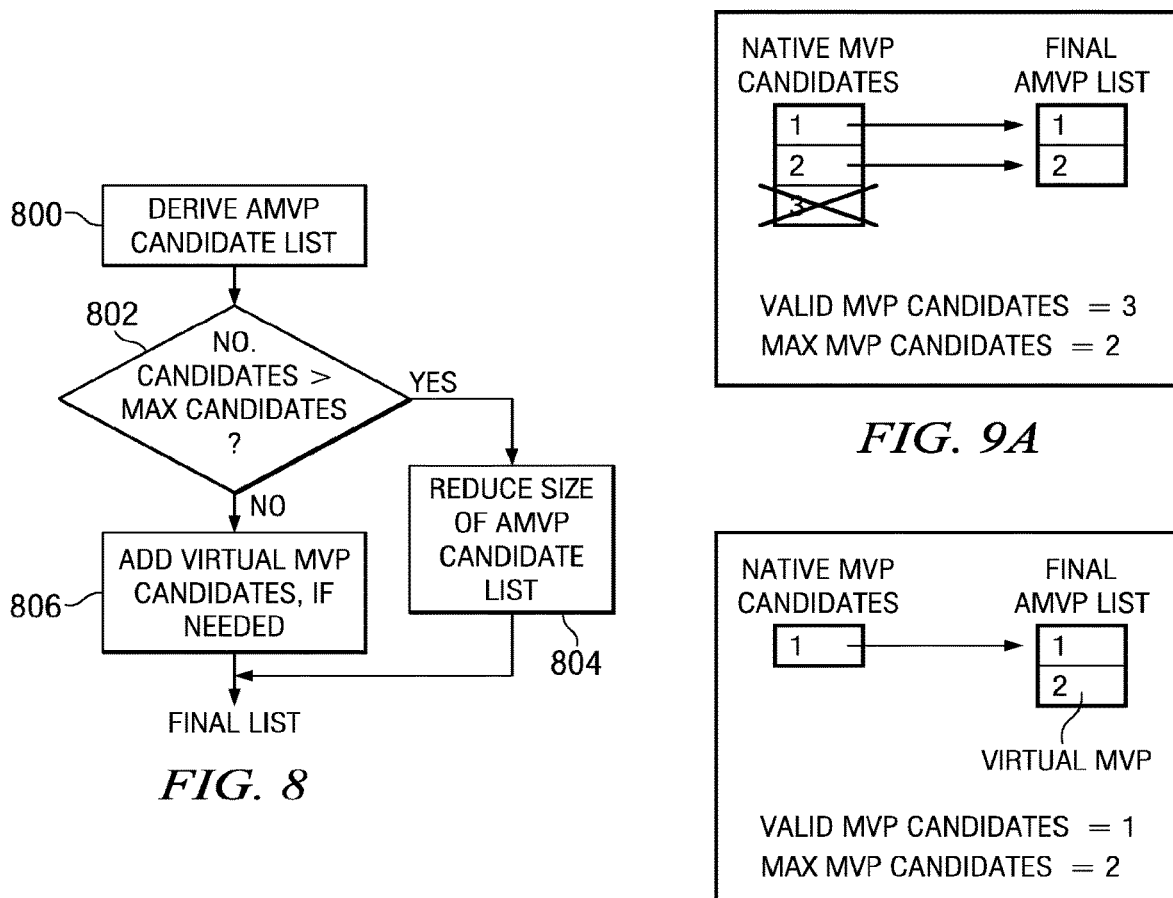
FIG. 8
FIG. 9A
FIG. 9B

INTER-PREDICTION CANDIDATE INDEX CODING INDEPENDENT OF INTER-PREDICTION CANDIDATE LIST CONSTRUCTION IN VIDEO CODING

CROSS-REFERENCE TO RELATED APPLICATIONS

This application is a continuation of U.S. patent application Ser. No. 16/839,284, filed Apr. 3, 2020, which is a continuation of U.S. patent application Ser. No. 16/384,750, filed Apr. 15, 2019 (now U.S. Pat. No. 10,638,149), which is a continuation of U.S. patent application Ser. No. 15/864,952, filed Jan. 8, 2018 (now U.S. Pat. No. 10,264,275), which is a continuation of U.S. patent application Ser. No. 13/523,772, filed Jun. 14, 2012 (now U.S. Pat. No. 9,866,859), which is a continuation-in-part under 37 CFR 1.53(b) of co-pending U.S. patent application Ser. No. 13/421,519, filed Mar. 15, 2012. This application claims benefit of U.S. Provisional Patent Application Ser. No. 61/496,934, filed Jun. 14, 2011, U.S. Provisional Patent Application Ser. No. 61/501,441, filed Jun. 27, 2011, and U.S. Provisional Patent Application Ser. No. 61/504,404, filed Jul. 5, 2011, all of which are incorporated herein by reference in their entirety.

BACKGROUND OF THE INVENTION

Field of the Invention

Embodiments of the present invention generally relate to coding of an inter-prediction candidate index independent of the construction of a corresponding inter-prediction candidate list in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. Several coding efficiency enhancement tools are proposed in HEVC, among them a merge mode designed to reduce coding overhead by allowing an inter-predicted prediction unit (PU) to inherit motion data, i.e., motion vectors, prediction direction, and reference picture indices, from a position selected from neighboring motion data positions in the same picture and a temporal motion data position derived based on a co-located block of the same size as the PU in a reference picture, referred to as the co-located PU.

A skip mode is also included that can be seen as a coding unit (CU) level merge mode with all zero transform coefficients. Regular motion vector coding for inter-prediction of a PU also considers motion vectors of selected neighboring motion data positions in the same picture and a temporal motion data position derived based on a co-located PU for use as motion vector predictors for the PU. While the currently defined merge mode, skip mode, and regular motion vector prediction do reduce coding overhead, additional improvements are desirable.

SUMMARY

Embodiments of the present invention relate to methods and apparatus for coding of a prediction candidate index independent of the construction of a corresponding prediction candidate list in video coding. In one aspect, a method for decoding an encoded video bit stream in a video decoder is provided that includes constructing an inter-prediction candidate list for a prediction unit (PU), decoding a candidate index for the PU inter-prediction candidate list, wherein a maximum allowed number of inter-prediction candidates for an inter-prediction candidate list is used as a maximum codeword size for truncated unary decoding of the candidate index, and decoding the PU using an inter-prediction candidate in the inter-prediction candidate list indicated by the candidate index.

In one aspect, a method for decoding an encoded video bit stream in a video decoder is provided that includes constructing a merging candidate list for a prediction unit (PU), decoding a merging candidate index for the merging candidate list, wherein a maximum allowed number of merging candidates for a merging candidate list is used as a maximum codeword size for truncated unary decoding of the merging candidate index, and decoding the PU using a merging candidate in the merging candidate list indicated by the merging candidate index.

In one aspect, a method for encoding a video stream in a video encoder to generate an encoded bit stream that includes constructing an inter-prediction candidate list for a prediction unit (PU), selecting a candidate index for the PU inter-prediction candidate list, and encoding the candidate index into the encoded bit stream, wherein a maximum allowed number of inter-prediction candidates for an inter-prediction candidate list is used as a maximum codeword size for truncated unary coding of the candidate index.

BRIEF DESCRIPTION OF THE DRAWINGS

Particular embodiments will now be described, by way of example only, and with reference to the accompanying drawings:

FIG. 5 is a block diagram of a digital system;

FIG. 8 is a flow diagram of a method for AMVP candidate list construction;

FIGS. 9A and 9B show examples of AMVP candidate list construction;

DETAILED DESCRIPTION OF EMBODIMENTS OF THE INVENTION

Figure 1:
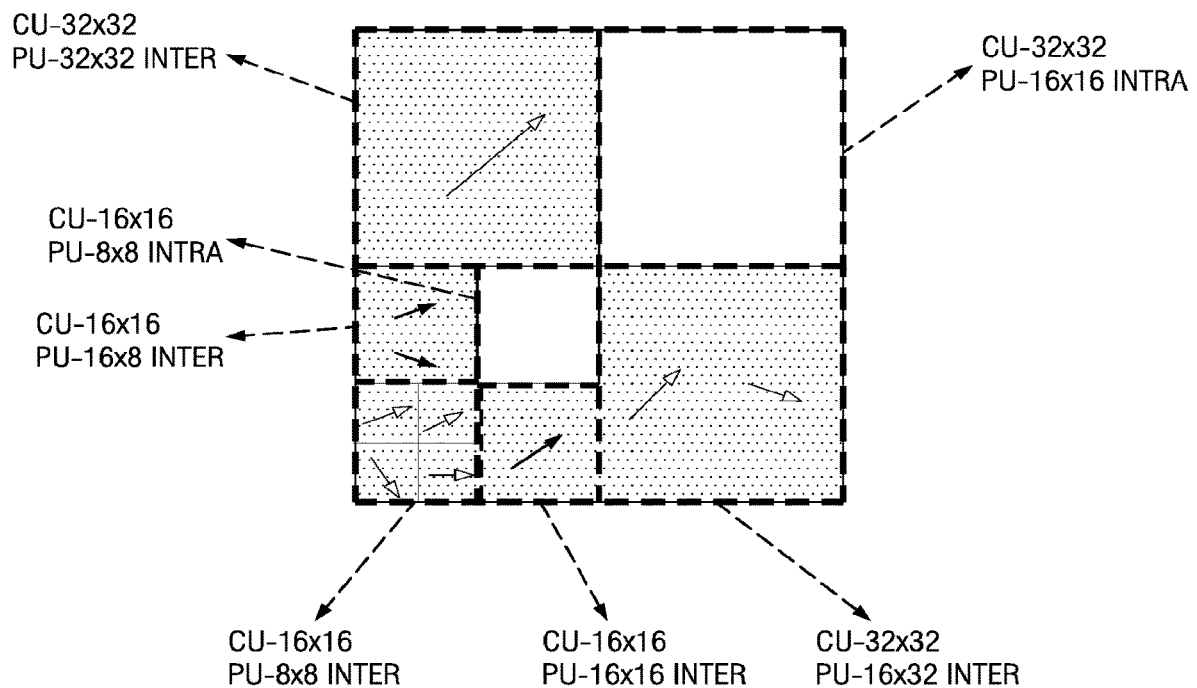
FIG. 1 is an example of decomposition of a largest coding unit (LCU) into coding units (CUs) and prediction units (PUs)

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC. In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted.

The coding node is the root node of two trees, a prediction tree and a transform tree. A prediction tree specifies the position and size of prediction units (PU) for a coding unit. A PU is the basic unit for carrying the information related to the prediction processes such as inter and intra-prediction. In general, a PU is not restricted to a square shape in order to facilitate partitioning that matches boundaries of real objects in a picture. A CU may be partitioned into one or more PUs. A transform tree specifies the position and size of transform units (TU) for a coding unit. A transform unit may not be larger than a coding unit. The sizes of the transforms units and prediction units for a CU are determined by the video encoder during prediction based on minimization of rate/distortion costs. FIG. 1 shows an example of an LCU of size 64×64 that is decomposed into CUs and PUs. In this example, the SCU size is 16×16. In HEVC, the SCU size may be as small as 8×8.

Some aspects of this disclosure have been presented to the JCT-VC in the following documents: M. Zhou et al., "A Study on HM3.0 Parsing Throughput Issue," JCTVC-F068, Jul. 14-22, 2011, and M. Zhou et al., "A Method of Decoupling Motion Data Reconstruction from Entropy Decoding," JCTVC-F347, Jul. 14-22, 2011, both of which are incorporated by reference herein in their entirety.

As previously discussed, merge mode, skip mode, and regular motion vector coding based on spatially neighboring PUs and a temporally co-located PU for prediction of PUs are proposed in HEVC. General descriptions of merge mode, skip mode, and regular motion vector coding are provided herein. More detailed descriptions of the emerging proposal may be found in T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), and B. Bross, et al., "High Efficiency Video Coding (HEVC) Text Specification Draft 7," JCTVC-11003_d0, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), all of which are incorporated by reference herein.

Figure 2:
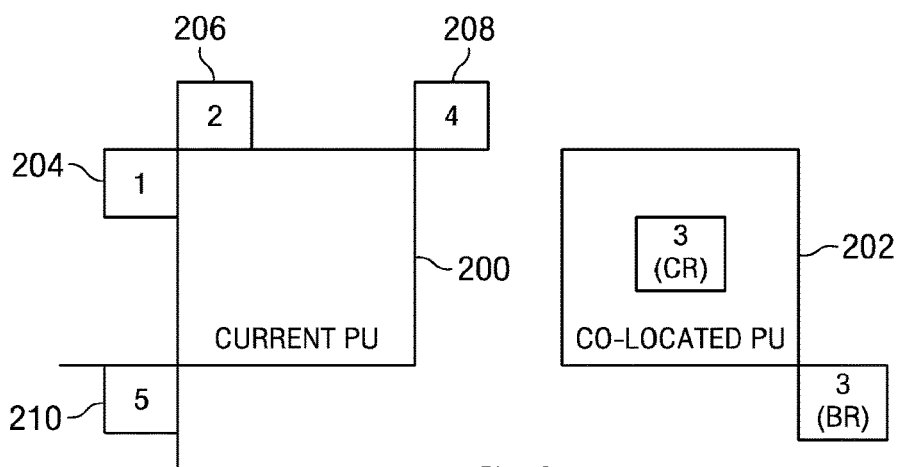
FIG. 2 is a block diagram illustrating prior art spatial and temporal motion data positions for constructing a merging candidate list.

In general, merge mode allows an inter-predicted PU to inherit the same motion vector(s), prediction direction, and a reference picture index (or indices) from an inter-predicted PU which contains a motion data position selected from a group of spatially neighboring motion data positions and one of two temporally co-located motion data positions. FIG. 2 illustrates candidate motion data positions for the merge mode as defined in WD3. For the current PU 200, the encoder forms a merging candidate list by considering merging candidates from the motion data positions depicted in FIG. 2: four spatially neighboring motion data (SMD) positions, i.e., a left neighboring SMD position 204, an upper neighboring SMD position 206, an upper right neighboring SMD position 208, and a bottom left neighboring SMD position 210, and two temporal motion data (TMD) positions of the a temporally co-located PU 202.

To choose the co-located temporal merging candidate, the co-located temporal motion data from the bottom-right TMD position (see 3 (BR) in FIG. 2, outside the co-located PU 202) is first checked and selected for the temporal merging candidate if available. Otherwise, the co-located temporal motion data at the central TMD position (see 3 (CR) in FIG. 2) is checked and selected for the temporal merging candidate if available. To derive the motion data for a merging candidate from a motion data position, the needed motion data is copied from the corresponding PU which contains (or covers) the motion data position. The merging candidates in the list, if available, are ordered in the merging candidate list as numbered in FIG. 2, with the merging candidate from the left neighboring SMD position 204 placed at the beginning of the list, the temporal merging candidate from the TMD position bottom-right to or inside the co-located PU 202, in the third position, and that of the bottom-left neighboring SMD position 210 placed at the end of the list. The derivation of the spatially neighboring merging candidates, the temporal neighboring merging candidate, and the criteria for availability are explained in WD3.

A merging candidate includes motion vector information, prediction list utilization flag information, and reference picture index information for a candidate motion data position. A merging candidate may include sufficient entries to accommodate a bi-directionally predicted PU, i.e., entries for a forward motion vector, a backward motion vector, a forward reference picture index, a backward reference picture index, and a prediction list utilization flag indicating prediction direction, i.e., forward, backward, or bi-directional. The prediction list utilization flag may be composed of two prediction list utilization flags used to indicate which of two reference picture lists, i.e., the forward reference picture list and the backward reference picture list, is to be used. Each reference picture index is an index into a respective one of the reference picture lists.

For a motion data position contained by a forward predicted PU, the merging candidate entries for the prediction list utilization flag, the forward motion vector, and the forward reference picture index will be valid and the remaining entries are set to indicate that they are not valid. For example, the forward prediction utilization flag may be set to 1, the values for the forward reference picture index and the motion vectors may be copied from the PU, the backward prediction list unitization flag may be set to 0, the backward reference picture index may be set to −1, and entries for the backward motion vectors set to placeholder values, e.g., 0. For a motion data position contained by a backward predicted PU, the merging candidate entries for the prediction list utilization flag, the backward motion vector, and the backward reference picture index will be valid and the remaining entries are set to indicate that they are not valid. For example, the backward prediction utilization flag may be set to 1, the values for the backward reference picture index and the motion vectors may be copied from the PU, the forward prediction list unitization flag may be set to 0, the forward reference picture index may be set to −1, and entries for the forward motion vectors set to placeholder values, e.g., 0. For a bi-directionally predicted PU, all merging candidate entries will be valid. For example, the forward and backward prediction utilization flags may be set to 1, and the values for the forward and backward reference picture indices and the motion vectors may be copied from the PU.

In HEVC, the merging candidate entries may be referred to according to their correspondence with one of two reference picture lists, list 0 and list 1. Thus, the forward motion vector may be referred to as the list 0 (or L0) motion vector, the backward motion vector may be referred to as the list 1 (or L1) motion vector, the two prediction list utilization flags be referred to as the list 0 (or L0) prediction list utilization flag and the list 1 (or L1) prediction list utilization flag, and the reference picture indices may be referred to as the list 0 (or L0) reference picture index and the list 1 (or L1) reference picture index.

After the merging candidate list is formed, a pruning process is carried out to remove any duplicated merging candidates. If two or more merging candidates have the same motion vector(s), prediction direction, and reference picture index (or indices), the lowest order duplicated merging candidate is retained in the list and the others are removed. If all the merging candidates are not valid, a zero motion vector merging candidate is added to the merging candidate list. Therefore, a merging candidate list for merge mode may have 1, 2, 3, 4 or 5 merging candidates. Invalidity of a merging candidate for merge mode is explained in WD3.

In general, skip mode allows the encoder to "skip" coding of an inter-predicted CU when it can be effectively inter-predicted from motion data of a neighboring PU or a temporally co-located CU. More specifically, skip mode allows an inter-predicted CU to inherit the motion data of a spatial or temporal neighbor, and no non-zero quantized transform coefficients are encoded for the CU. Skip mode is determined at the CU level and is essentially a merge mode at the CU-level without non-zero transform coefficients. Thus, for skip mode, the encoder generates a merging candidate list as previously described except that the current PU is a CU. The same relative positions for the spatial merging candidates and the temporal merging candidate are used. A merging candidate for skip mode also contains the same information as previously described for a merging candidate.

In general, for direct or normal inter-prediction, motion vector(s) of a PU is (are) predicatively coded relative to a motion vector predictor(s) (MVP(s)) from an advanced motion vector predictor (AMVP) candidate list constructed by the encoder. For single direction inter-prediction of a PU, the encoder generates a single AMVP candidate list. For bi-directional prediction of a PU, the encoder generates two AMVP candidate lists, one using motion data of spatial and temporal neighboring PUs from the forward prediction direction and one using motion data of spatial and temporal neighboring PUs from the backward prediction direction.

Figure 3:
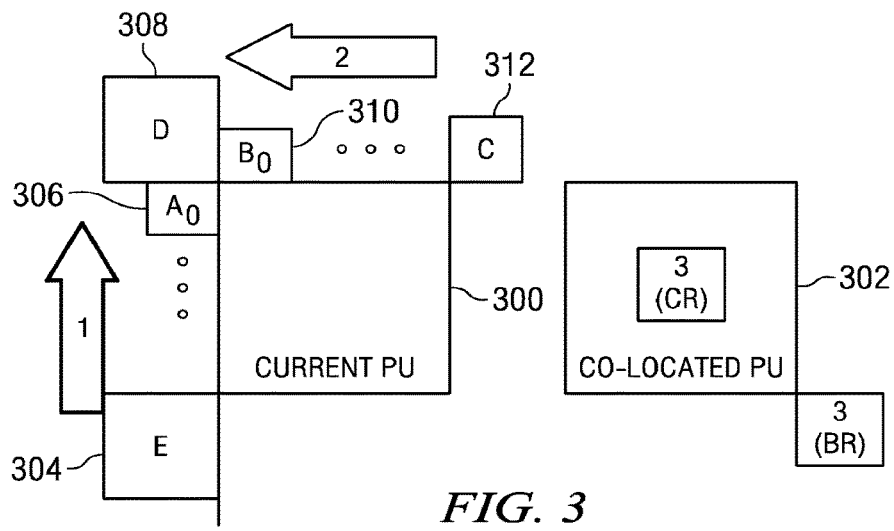
FIG. 3 is a block diagram of illustrating prior art spatial and temporal motion data positions for constructing an advanced motion vector predictor (AMVP) candidate list.

FIG. 3 illustrates the formation of an AMVP candidate list for the current PU 300 as defined in WD3. The encoder forms an AMVP candidate list based on neighboring SMD positions and TMD positions of a co-located PU 302 as illustrated in the example of FIG. 3. The motion vectors for a motion data position are selected as an MVP from the motion data of the corresponding PU which contains (covers) the motion data position. For the spatial MVP candidate derivation, the SMD positions to the left of the current PU 300 are scanned bottom up, e.g., from the bottom left SMD position 304 to the left top SMD position 306, and the motion vector of the first SMD position on the left side having available motion data is chosen to be the first MVP candidate for the AMVP candidate list.

Then, the upper side neighboring SMD positions are scanned left to right, e.g., from the top right SMD position 312, through the left top SMD position 310, ending with the top left SMD position 308. The motion vector of the first SMD position on the upper neighboring side having available motion data with a motion vector of a different value from the first MVP candidate is chosen as the second MVP candidate in the AMVP candidate list. If no spatial MVP candidate is found during the scan of the left-side SMD positions, then up to two MVP candidates may be selected from the top-side SMD positions. That is, the first available motion vector of the upper side is chosen as the first MVP candidate in the AMVP candidate list and the second available motion vector different from the first is chosen as the second MVP candidate in the AMVP candidate list.

To chose the temporal MVP candidate, the availability of motion data from the bottom-right TMD position of the co-located PU 302 (see 3 (BR) in FIG. 3, outside the co-located PU 202) is first checked and the motion vector selected for the temporal MVP candidate if available. Otherwise, the availability of motion data at the central TMD position of the co-located PU 302 (see 3 (CR) in FIG. 3) is checked and the motion vector selected for the temporal MVP candidate if available. Note that this is essentially the same derivation process as that used to select the temporal merging candidate in the merging candidate list derivation process. The temporal MVP candidate is added to the AMVP candidate list in the third position. The derivation of the spatial MVP candidates, the temporal MVP candidate, and the criteria for availability for the AMVP candidate list are explained in WD3.

If no MVP candidates are found in the scans of the left/upper SMD positions and from the co-located temporal PU, a zero MVP candidate is added to the AMVP candidate list. After the AMVP candidate list is formed, a pruning process similar to that used in pruning the merging candidate list is carried out to remove any duplicated MVP candidates. Therefore, an AMVP candidate list may have 1, 2, or 3 MVP candidates.

In general, for a CU, the encoder generates a merging candidate list for skip mode, a merging candidate list for each PU in the CU, and one or two AMVP candidate lists for each PU in the CU. The encoder then uses the best candidates in each list in the determination of rate/distortion (RD) costs for using each mode. For each PU, the encoder selects the better mode between merge and normal inter-predicted mode based on the RD costs. The sum of the costs for the selected modes for all PUs in the CU is the RD cost for the CU for inter-predicted mode, i.e., non-skipped and non-intra coded mode. At the CU level, the encoder chooses the best mode among skip mode, inter-predicted mode, and Intra-predicted mode based on the RD costs of each.

For each inter-predicted CU, the encoder encodes a skip flag into the bit stream to signal whether or not the current CU is coded with skip mode. If skip mode is used, the encoder also encodes the index in the merging candidate list generated for skip mode of the merging candidate selected (unless there is only one entry in the list). If skip mode is not used for the CU and intra-prediction is not selected, the encoder encodes a merge flag into the bit stream for each inter-predicted PU of the CU to signal whether or not merge mode is used for the PU. If merge mode is used, the encoder also encodes the index in the merging candidate list of the merging candidate selected for merging (unless there is only one entry in the list). If merge mode is not used, the encoder encodes the normal inter-prediction information for the PU in the bit stream such as an index (or indices) into the AMVP candidate list(s) for the MVP candidate(s) selected for differential encoding of the motion vector(s), prediction direction(s), motion vector differences (MVDs), and the reference picture index (or indices).

For entropy coding of the merging candidate index or the AMVP candidate index using context-adaptive binary arithmetic coding (CABAC), truncated unary coding is used in which the maximum codeword size is dictated by the corresponding candidate list size, i.e., 1, 2, 3, 4, or 5 for a merging candidate list or 1, 2, 3 for an AMVP candidate list. More specifically, an inter-prediction candidate index is binarized using truncated unary coding. In truncated unary coding, if an integer value x to be coded is less than a truncated value S, the coded result is x continuous "1" bits followed by a terminating "0" bit. Otherwise, the coded result is S continuous "1" bits. For example, let S=3. If x=2, the coded result is "110". If x=3, the coded result is "111". For truncated unary coding of an inter-prediction candidate index, the truncated value S, which is the previously mentioned maximum codeword size, is set to the number of candidates minus 1 in the corresponding inter-prediction candidate list at the PU level. Further, the context selection for the bins of a merging candidate index depends on the number of candidates in the corresponding merging candidate list and which of the merging candidates are in the list.

The decoder is also required to construct a merging candidate list, and/or up to two AMVP candidate lists when decoding an inter-predicted PU, depending upon which mode was used for inter-prediction in the encoder, and a merging candidate list for an inter-predicted CU when skip mode was used by the encoder. The construction of these lists is the same as that performed in the encoder.

Figure 4:
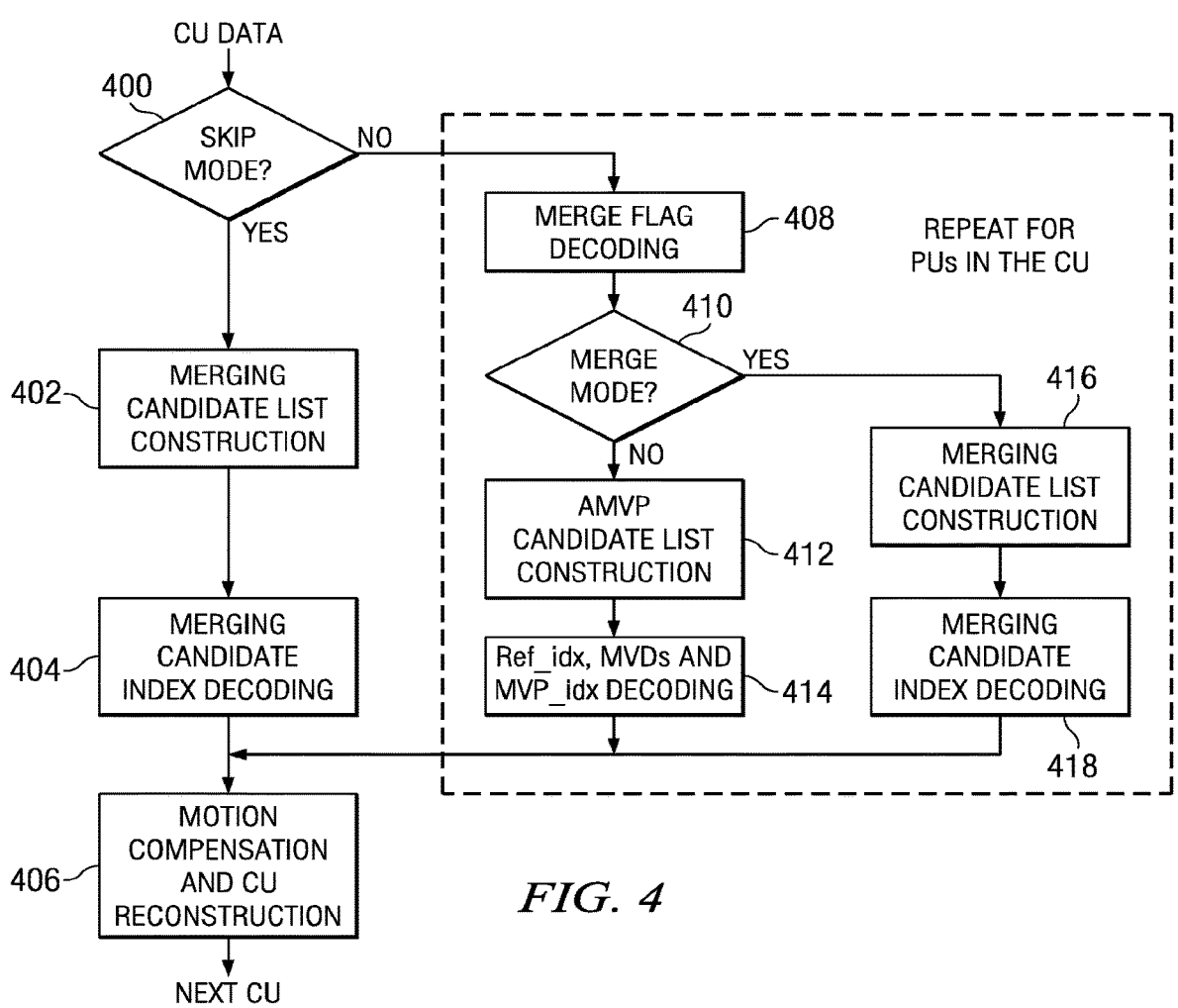
FIG. 4 is a block diagram illustrating decoding of an inter-predicted coding unit (CU)

FIG. 4 illustrates decoding of an inter-predicted CU in WD3. If skip mode is signaled 400 for the CU, a merging candidate list is constructed 402 for the CU using the same candidate PUs and construction criteria as the encoder. The merging candidate index is then decoded 404 (if present), and motion compensation and reconstruction are performed 406 using the indicated merging candidate from the merging candidate list. The decoding of the merging candidate index includes performing the inverse of the truncated unary coding performed by the encoder in encoding the index, and is thus dependent on the number of merging candidates the constructed merging candidate list.

If skip mode is not signaled 400 for the CU, then the operations in the dotted box are repeated for each PU in the CU. For each PU, the merge flag is decoded 408. If the decoded merge flag indicates that merge mode was not used 410, one or two AMVP lists are constructed 412 depending on the prediction direction, the reference picture index (or indices) (Ref_idx), MVDs, and AMVP candidate list index (or indices) (if present) are decoded 414, and motion compensation and reconstruction are performed 406 using this information. An AMVP candidate list is constructed using the same candidate PUs and construction criteria as the encoder. The decoding of the AMVP candidate index includes performing the inverse of the truncated unary coding performed by the encoder in encoding the index, and is thus dependent on the number of MVP candidates in the constructed AMVP candidate list.

If the decoded merge flag indicates that merge mode was used 410, a merging candidate list is constructed 416 for the PU using the same candidate PUs and construction criteria as the encoder. The merging candidate index is then decoded 418 (if present), and motion compensation and reconstruction are performed 406 using the indicated merging candidate from the merging candidate list. The decoding of the merging candidate index includes performing the inverse of the truncated unary coding performed by the encoder in encoding the index, and is thus dependent on the number of merging candidates in the constructed merging candidate list.

As previously mentioned, there is a dependency between the construction of the merging candidate list and the decoding of the merging candidate index and between the construction of the AMVP candidate last and the decoding of the AMVP candidate index. The merging candidate index or AMVP candidate index for a PU is not encoded in the encoded video bit stream when the size of the corresponding candidate list is one. Otherwise, the decoding of the encoded merging candidate index or encoded AMVP candidate index depends on the size of the corresponding candidate list. The size of a merging candidate list or an AMVP candidate list is not known until the candidate list is constructed. Thus, the decoder is required to construct a merging candidate list or AMVP candidate list for a PU in order to determine whether or not a candidate index is in the encoded bit stream and in order to decode the corresponding candidate index when the candidate index is in the encoded bit stream.

This dependency of the candidate index decoding on the construction of the corresponding candidate list may cause both robustness and throughput issues. The construction of an AMVP candidate list or a merging candidate list consumes a significant number of processing cycles due to the reconstruction of motion data (e.g., motion vectors, prediction directions, reference frame indices, etc.) required to construct these candidate lists. Further, the interdependency of candidate index decoding on candidate list construction requires performing candidate list construction and entropy decoding of the candidate index, if present, sequentially. The cycle time overhead of this sequential operation may significantly decrease the decoding throughput, making it difficult, if not impossible, to achieve real-time decoding in a practical decoder implementation. Further, any corruption in the encoded motion data may cause incorrect construction of a merging candidate list or AMVP candidate list, which in turn may cause incorrect decoding of the corresponding candidate index and may eventually cause parsing of the encoded bit stream to halt. In addition, in some modes, a decoder may just need to reconstruct DCT-coefficients without reconstruction of motion data. However, due to the interdependency of candidate index decoding on candidate list construction, the decoder would be required to fully reconstruct the motion data to be able to parse the bit stream.

Embodiments of the invention provide for decoupling the encoding of an inter-prediction candidate index, i.e., a merging candidate index or an AMVP candidate index, from the construction of the inter-prediction candidate list, i.e., the corresponding merging candidate list or AMVP candidate list, such decoding of an inter-prediction candidate index may be performed independent of the construction of the corresponding inter-prediction candidate list. Rather than using the actual size of an inter-prediction candidate list as constructed according to the criteria in the prior art as the maximum codeword length for truncated unary coding or decoding of a candidate index as in the prior art, a maximum size of the inter-prediction candidate list is used as the maximum codeword length. Further, the context selection for CABAC coding of a candidate index is changed to depend on the value of the CABAC bin index.

The maximum size of an inter-prediction candidate list dictates the maximum number of inter-prediction candidates allowed in the list. In some embodiments, the maximum size of the merging candidate list and the maximum size of the AMVP candidate list may be pre-determined, i.e., the sizes are known to both the encoder and the decoder. In some embodiments, the maximum size of each of the inter-prediction candidate lists may be chosen by the encoder and signaled to the decoder in the encoded bit stream. For example, the encoder may choose and signal a maximum size for each candidate list for each slice in a picture. In some embodiments, the maximum size for one inter-prediction candidate list may be pre-determined and a maximum size for the other inter-prediction candidate list may be chosen by the encoder and signaled to the decoder. For example, the maximum size of an AMVP candidate list may be pre-determined and the maximum size of the merging candidate list may be variable.

In some embodiments, the construction of an inter-prediction candidate list includes derivation of native inter-prediction candidates from the motion data positions specified for the particular inter-prediction candidate list and then modifying the resulting candidate list as needed to attain the corresponding maximum size. A native inter-prediction candidate is composed of motion data from a motion data position selected during the derivation process. If the number of native inter-prediction candidates in an inter-prediction candidate list is larger than the associated maximum size after the derivation process, selected inter-prediction candidates are removed in from the inter-prediction candidate list to reduce the size to the maximum size.

In some embodiments, if the number of inter-prediction candidates in an inter-prediction candidate list is less than the associated maximum size after the derivation process, virtual inter-prediction candidates are added to the inter-prediction candidate list to increase the size to the maximum size. In such embodiments, an inter-prediction candidate list may include both native and virtual candidates, only native candidates, or, in cases where there are no native inter-prediction candidates after the derivation process, only virtual candidates. The addition of virtual inter-prediction candidates to an inter-prediction candidate list may improve coding efficiency as a virtual inter-prediction candidate may provide better coding results than a native inter-prediction candidate.

In some embodiments, when a slice is a bi-directionally predicted slice (B-slice), virtual candidates that may be added to a merging candidate list to increase the size to the maximum size may be combined candidates, also referred to as combined bi-predictive merging candidates. A merging candidate for a bi-predicted PU includes a forward motion vector and forward reference picture index and a backward motion vector and backward reference picture index. A combined bi-predictive merging candidate is a merging candidate formed by combining a forward motion vector and a forward reference picture index of a native merging candidate in a merging candidate list with a backward motion vector and a backward reference picture index from another native merging candidate in the merging candidate list. The specific combinations allowed and the priority in which a combination is considered for addition to a merging candidate list is pre-determined.

FIG. 5 shows a block diagram of a digital system that includes a source digital system 500 that transmits encoded video sequences to a destination digital system 502 via a communication channel 516. The source digital system 500 includes a video capture component 504, a video encoder component 506, and a transmitter component 508. The video capture component 504 is configured to provide a video sequence to be encoded by the video encoder component 506. The video capture component 504 may be, for example, a video camera, a video archive, or a video feed from a video content provider. In some embodiments, the video capture component 504 may generate computer graphics as the video sequence, or a combination of live video, archived video, and/or computer-generated video.

The video encoder component 506 receives a video sequence from the video capture component 504 and encodes it for transmission by the transmitter component 508. The video encoder component 506 receives the video sequence from the video capture component 504 as a sequence of pictures, divides the pictures into largest coding units (LCUs), and encodes the video data in the LCUs. The video encoder component 506 may be configured to perform inter-prediction candidate list construction during the encoding process as described herein. An example of the video encoder component 506 is described in more detail herein in reference to FIG. 6.

The transmitter component 508 transmits the encoded video data to the destination digital system 502 via the communication channel 516. The communication channel 516 may be any communication medium, or combination of communication media suitable for transmission of the encoded video sequence, such as, for example, wired or wireless communication media, a local area network, or a wide area network.

The destination digital system 502 includes a receiver component 510, a video decoder component 512 and a display component 514. The receiver component 510 receives the encoded video data from the source digital system 500 via the communication channel 516 and provides the encoded video data to the video decoder component 512 for decoding. The video decoder component 512 reverses the encoding process performed by the video encoder component 506 to reconstruct the LCUs of the video sequence. The video decoder component 512 may be configured to perform inter-prediction list construction during the decoding process as described herein. An example of the video decoder component 512 is described in more detail below in reference to FIG. 7.

The reconstructed video sequence is displayed on the display component 514. The display component 514 may be any suitable display device such as, for example, a plasma display, a liquid crystal display (LCD), a light emitting diode (LED) display, etc.

In some embodiments, the source digital system 500 may also include a receiver component and a video decoder component and/or the destination digital system 502 may include a transmitter component and a video encoder component for transmission of video sequences both directions for video steaming, video broadcasting, and video telephony. Further, the video encoder component 506 and the video decoder component 512 may perform encoding and decoding in accordance with one or more video compression standards. The video encoder component 506 and the video decoder component 512 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 6:
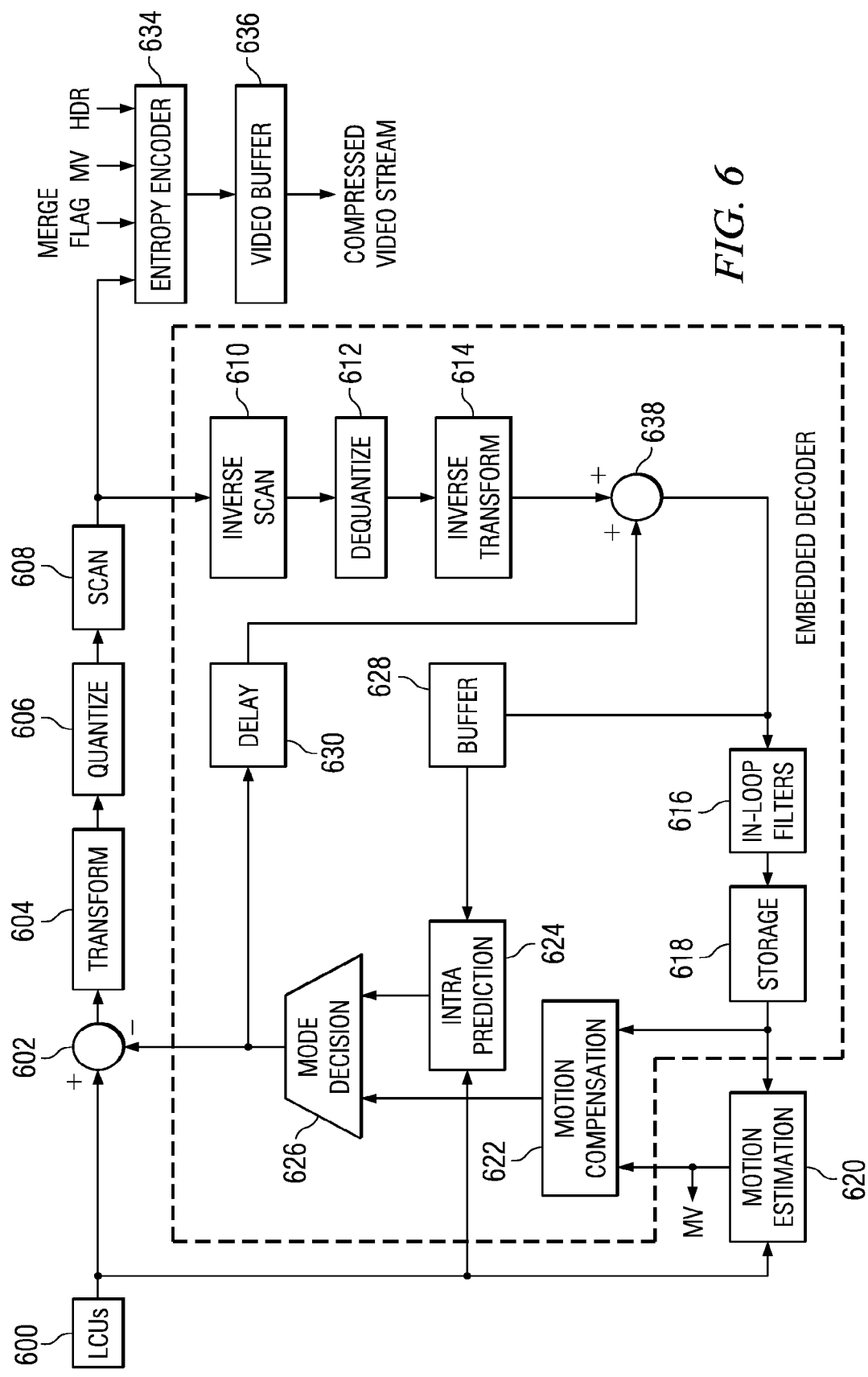
FIG. 6 is a block diagram of a video encoder.

FIG. 6 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing. The coding control component also may determine the initial LCU CU structure for each CU and provides information regarding this initial LCU CU structure to the various components of the video encoder as needed. The coding control component also may determine the initial PU and truncated unary structure for each CU and provides information regarding this initial structure to the various components of the video encoder as needed.

The LCU processing receives LCUs of the input video sequence from the coding control component and encodes the LCUs under the control of the coding control component to generate the compressed video stream. The CUs in the CU structure of an LCU may be processed by the LCU processing in a depth-first Z-scan order. The LCUs 600 from the coding control unit are provided as one input of a motion estimation component 620, as one input of an intra-prediction component 624, and to a positive input of a combiner 602 (e.g., adder or subtractor or the like). Further, although not specifically shown, the prediction mode of each picture as selected by the coding control component is provided to a mode selector component and the entropy encoder 634.

The storage component 618 provides reference data to the motion estimation component 620 and to the motion compensation component 622. The reference data may include one or more previously encoded and decoded CUs, i.e., reconstructed CUs.

The motion estimation component 620 provides motion data information to the motion compensation component 622 and the entropy encoder 634. More specifically, the motion estimation component 620 performs tests on CUs in an LCU based on multiple inter-prediction modes (e.g., skip mode, merge mode, and normal or direct inter-prediction) and transform block sizes using reference picture data from storage 618 to choose the best motion vector(s)/prediction mode based on a rate distortion (RD) coding cost. To perform the tests, the motion estimation component 620 may begin with the CU structure provided by the coding control component. The motion estimation component 620 may divide each CU indicated in the CU structure into PUs according to the unit sizes of prediction modes and into transform units according to the transform block sizes and calculate the coding costs for each prediction mode and transform block size for each CU. The motion estimation component 620 may also compute CU structure for the LCU and PU/TU partitioning structure for a CU of the LCU by itself.

As mentioned above, the prediction modes considered by the motion estimation component 620 may be merge mode, skip mode, and regular (normal) inter-prediction mode. To consider skip mode, the motion estimation component 620 constructs a merging candidate list for skip mode at the CU level. To consider merge mode, the motion estimation component 620 constructs a merging candidate list for each PU in the CU. To consider regular inter-prediction mode, the motion estimation component 620 estimates motion vectors and constructs one or two AMVP candidate lists (depending on prediction direction) for each PU. Construction of a merging candidate list and an AMVP candidate list may be performed as per methods for inter-prediction candidate list construction described herein.

As is explained in more detail herein, the construction of a merging candidate list is based on a maximum allowed number of merging candidates for a merging candidate list and the construction of an AMVP candidate list is based on a maximum allowed number of MVP candidates for an AMVP candidate list. In some embodiments, the maximum allowed number of candidates for a merging candidate list and an AMVP candidate list may be pre-determined by the video coding standard such that the sizes are known to both the encoder and the decoder. For example, the maximum allowed number of merging candidates for a merging candidate list may be fixed to be 5 and the maximum allowed number of MVP candidates for an AMVP candidate list may be fixed to be 3. In some embodiments, the maximum allowed number of candidates for each of these candidate lists may be chosen by the encoder and signaled to the decoder. For example, the encoder may choose and signal a maximum allowed number of candidates for each inter-prediction candidate list for each slice in a picture. In some embodiments, the maximum allowed number of candidates for one inter-prediction candidate list may be fixed and the maximum allowed number of candidates for the other inter-prediction candidate list may be chosen by the encoder and signaled to the decoder. For example, the maximum allowed number of candidates for an AMVP candidate list may be fixed to 2 and the maximum allowed number of candidates for a merging candidate list may be chosen by the encoder for each slice.

The encoder may choose the maximum allowed number of candidates for an inter-prediction candidate list in any suitable way. For example, the encoder may choose the maximum allowed number of candidates based on the prediction type of the slice (P or B), e.g., the encoder may set the maximum size of a merging candidate list to five for a B-slice and to three for a P-slice. In another example, the encoder choice may be content adaptive, e.g., may consider statistics and coding results of a previous slice or slices to decide on the optimal maximum allowed number of candidates for the current slice. In another example, the encoder choice may be based on the processing capabilities of the encoder and throughput requirements. For example, a resource-limited encoder may choose a larger maximum allowed number of candidates for low fidelity video such as 720p@30 and a smaller maximum allowed number of candidates for high fidelity video such as 1080p@30.

For each PU of a CU, the motion estimation component 620 computes coding costs for each entry in the merging candidate list and selects the entry with the best result. The coding cost of this entry is used by the motion estimation component 620 in prediction mode selection. For each PU of the CU, the motion estimation component 620 determines the best motion vectors and MVP(s) from the AMVP candidate list(s) based on coding costs, and uses the best coding cost for prediction mode selection. For each PU in the CU, the motion estimation component selects the better of merge mode and normal inter-predicted mode based on the coding costs. The sum of the costs of the selected modes for all PUs in the CU is the rate distortion (RD) cost for the CU in inter-predicted mode. For the CU, the motion estimation component 620 also computes coding costs for each entry in the skip mode merging candidate list and selects the entry with the best result. The coding cost of this entry is used by the motion estimation component 620 in prediction mode selection between CU-level skip mode and normal inter-predicted mode.

For coding efficiency, the motion estimation component 620 may also decide to alter the CU structure by further partitioning one or more of the CUs in the CU structure. That is, when choosing the best motion vectors/prediction modes, in addition to testing with the initial CU structure, the motion estimation component 620 may also choose to divide the larger CUs in the initial CU structure into smaller CUs (within the limits of the recursive quadtree structure), and calculate coding costs at lower levels in the coding hierarchy. If the motion estimation component 620 changes the initial CU structure, the modified CU structure is communicated to other components that need the information.

The motion estimation component 620 provides the selected motion vector (MV) or vectors and the selected prediction mode for each inter-predicted PU of a CU to the motion compensation component 622 and the selected motion vector (MV), reference picture index (indices), prediction direction (if any) to the entropy encoder 634. If merge mode or skip mode provides the best motion vector(s)/prediction mode for a PU or CU based on a coding cost, the motion estimation component 620 also indicates to the entropy encoder 634 to encode a merge (skip) flag indicating that merge (skip) mode is used for a PU (CU) and to encode an index into the merging candidate list for the entry that provided the best coding cost. The index may not be encoded if the maximum merging candidate list size is one; instead it is inferred to be 0.

If merge mode did not provide the best coding cost for an inter-predicted PU, the motion estimation component 620 indicates to the entropy encoder 634 to encode a merge flag indicating that merge mode was not used for the PU. A merge flag is encoded for each inter-predicted PU unless skip mode is selected for the CU containing the PU. Further, if normal inter-prediction mode provided the best coding cost, the motion estimation component 620 indicates to the entropy encoder 634 to encode an index (or indices) into the AMVP candidate list(s) for the MVP candidate(s) used for differential prediction of the motion vector(s). The index (or indices) may not be encoded if the maximum AMVP candidate list size is one; instead it is inferred to be 0.

The motion compensation component 622 provides motion compensated inter-prediction information to the mode decision component 626 that includes motion compensated inter-predicted PUs, the selected inter-prediction modes for the inter-predicted PUs, and corresponding transform block sizes. The coding costs of the inter-predicted PUs are also provided to the mode decision component 626.

The intra-prediction component 624 provides intra-prediction information to the mode decision component 626 that includes intra-predicted PUs and the corresponding intra-prediction modes. That is, the intra-prediction component 624 performs intra-prediction in which tests based on multiple intra-prediction modes and transform unit sizes are performed on CUs in an LCU using previously encoded neighboring PUs from the buffer 628 to choose the best intra-prediction mode for each PU in the CU based on a coding cost. To perform the tests, the intra-prediction component 624 may begin with the CU structure provided by the coding control component 640. The intra-prediction component 624 may divide each CU indicated in the CU structure into PUs according to the unit sizes of the intra-prediction modes and into transform units according to the transform block sizes and calculate the coding costs for each prediction mode and transform block size for each PU.

For coding efficiency, the intra-prediction component 624 may also decide to alter the CU structure by further partitioning one or more of the CUs in the CU structure. That is, when choosing the best prediction modes, in addition to testing with the initial CU structure, the intra-prediction component 624 may also chose to divide the larger CUs in the initial CU structure into smaller CUs (within the limits of the recursive quadtree structure), and calculate coding costs at lower levels in the coding hierarchy. If the intra-prediction component 624 changes the initial CU structure, the modified CU structure is communicated to other components in the LCU processing component 642 that need the information. Further, the coding costs of the intra-predicted PUs and the associated transform block sizes are also provided to the mode decision component 626.

The mode decision component 626 selects between the motion-compensated inter-predicted PUs from the motion compensation component 622 and the intra-predicted PUs from the intra-prediction component 624 based on the coding costs of the PUs and the picture prediction mode provided by the mode selector component. The output of the mode decision component 626, i.e., the predicted PU, is provided to a negative input of the combiner 602 and to a delay component 630. The associated transform block size is also provided to the transform component 604. The output of the delay component 630 is provided to another combiner (i.e., an adder) 638. The combiner 602 subtracts the predicted PU from the current PU to provide a residual PU to the transform component 604. The resulting residual PU is a set of pixel difference values that quantify differences between pixel values of the original PU and the predicted PU. The residual blocks of all the PUs of a CU form a residual CU block for the transform component 604.

The transform component 604 performs block transforms on the residual CU to convert the residual pixel values to transform coefficients and provides the transform coefficients to a quantize component 606. The transform component 604 receives the transform block sizes for the residual CU and applies transforms of the specified sizes to the CU to generate transform coefficients.

The quantize component 606 quantizes the transform coefficients based on quantization parameters (QPs) and quantization matrices provided by the coding control component and the transform sizes. The quantized transform coefficients are taken out of their scan ordering by a scan component 608 and arranged by significance, such as, for example, beginning with the more significant coefficients followed by the less significant.

The ordered quantized transform coefficients for a CU provided via the scan component 608 along with header information for the CU are coded by the entropy encoder 634, which provides a compressed bit stream to a video buffer 636 for transmission or storage. The header information may include the prediction mode used for the CU. If the CU is inter-predicted, and all the transform coefficients after quantization are zero, the CU is coded with skip mode, a skip flag equal to one is encoded into bit stream, and an index into the merging candidate list for the merging candidate used for the skip mode is also encoded unless the maximum size of the merging candidate list is one.

Otherwise, a merge flag is encoded for each PU of the CU unless the CU is intra-predicted. Further, if merge mode is the actual mode selected for prediction of a PU, an index into the merging candidate list for the merging candidate used for prediction of the PU is also encoded unless the maximum size of the merging candidate list is one. Otherwise, if a PU is encoded with normal or regular inter-predicted mode, motion data for the PU, including motion vector difference(s), reference picture index (indices), and a prediction direction flag for the PU, is encoded into bit stream. An index (or two indices) into the AMVP candidate list(s) for the MVP candidate(s) used for prediction of the PU is also encoded unless the maximum size of the AMVP candidate list(s) is one. The entropy encoder 634 also encodes the CU and PU structure of each LCU.

The entropy encoder 634 encodes a candidate index based on the maximum allowed number of candidates allowed in the corresponding inter-prediction candidate list. That is, a candidate index is binarized using truncated unary coding in which the maximum codeword size, i.e., the truncated value S, is one less than the maximum allowed number of candidates for the corresponding candidate list, and the resulting bins are encoded in the encoded bit stream using binary arithmetic coding. Further, in embodiments in which the encoder selects the maximum allowed number of candidates for an inter-prediction candidate list, the entropy encoder 634 encodes the selected maximum allowed number in the encoded bit stream. For example, if the encoder selects the maximum allowed number of candidates for an inter-prediction candidate list for each slice in a picture, the entropy encoder 634 encodes an indicator of that maximum allowed number in header information for each slice. The indicator may be, for example, the actual maximum allowed number or some other value that represents the maximum allowed number. For example, rather than encoding the actual maximum allowed number, the result of subtracting the actual maximum allowed number from 5 may be encoded.

Table 1 shows truncated unary coding tables for binarization of a merging candidate index assuming that the value of the maximum allowed number of merging candidates may range from 1 to 5. Each column of Table 1 is a truncated unary coding table for the associated maximum allowed number of merging candidates. Table 2 shows truncated unary coding tables for binarization of an AMVP candidate index assuming that the value of the maximum allowed number of AMVP candidates may range from 1 to 3. Each column of Table 2 is a truncated unary coding table for the associated maximum allowed number of AMVP candidates.

TABLE 1

| merging candidate index | Maximum allowed number merging candidates | | | | |
|---|---|---|---|---|---|
| | 1 | 2 | 3 | 4 | 5 |
| 0 | N/A | 0 | 0 | 0 | 0 |
| 1 | | 1 | 10 | 10 | 10 |
| 2 | | | 11 | 110 | 110 |
| 3 | | | | 111 | 1110 |
| 4 | | | | | 1111 |

TABLE 2

| AMVP candidate index | Maximum allowed number AMVP candidates | | |
|---|---|---|---|
| | 1 | 2 | 3 |
| 0 | N/A | 0 | 0 |
| 1 | | 1 | 10 |
| 2 | | | 11 |

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a PU provided via the scan component 608 are returned to their original post-transform arrangement by an inverse scan component 610, the output of which is provided to a dequantize component 612, which outputs a reconstructed version of the transform result from the transform component 604.

The dequantized transform coefficients are provided to the inverse transform component 614, which outputs estimated residual information which represents a reconstructed version of a residual PU. The inverse transform component 614 receives the transform block size used to generate the transform coefficients and applies inverse transform(s) of the specified size to the transform coefficients to reconstruct the residual values.

The reconstructed residual PU is provided to the combiner 638. The combiner 638 adds the delayed selected PU to the reconstructed residual PU to generate an unfiltered reconstructed PU, which becomes part of reconstructed picture information. The reconstructed picture information is provided via a buffer 628 to the intra-prediction component 624 and to an in-loop filter component 616. The in-loop filters component 616 applies various filters to the reconstructed picture information to improve the reference picture used for encoding/decoding of subsequent pictures. The in-loop filters component 616 may, for example, adaptively apply low-pass filters to block boundaries according to the boundary strength to alleviate blocking artifacts causes by the block-based video coding. Adaptive loop filtering and sample adaptive offset filtering may also be performed. The filtered reference data is provided to storage component 618.

Figure 7:
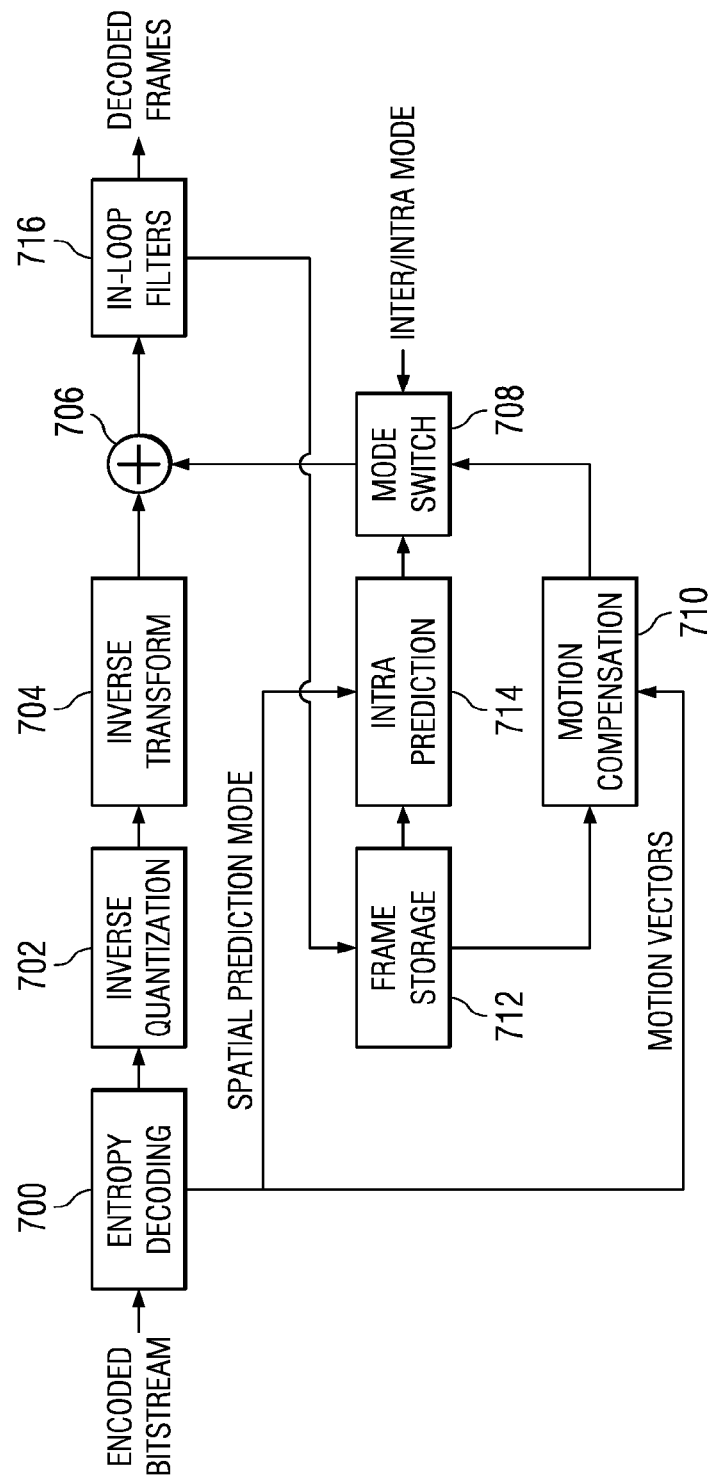
FIG. 7 is a block diagram of a video decoder.

FIG. 7 shows a block diagram of an example video decoder. The video decoder operates to reverse the encoding operations, i.e., entropy coding, quantization, transformation, and prediction, performed by the video encoder of FIG. 6 to regenerate the pictures of the original video sequence. In view of the above description of a video encoder, one of ordinary skill in the art will understand the functionality of components of the video decoder without detailed explanation.

The entropy decoding component 700 receives an entropy encoded (compressed) video bit stream and reverses the entropy coding to recover the encoded PUs and header information such as the prediction modes and the encoded CU and PU structures of the LCUs, merge flags, merge indices, etc. The entropy decoding component 700 constructs appropriate inter-prediction candidate lists when skip mode is indicated for a CU or merge mode or normal inter-prediction mode is indicated for a PU. Each inter-prediction candidate list is constructed in an identical fashion to the construction of the list in the encoder. Accordingly, construction of an inter-prediction candidate list is based on a maximum allowed number of candidates for the list.

In some embodiments, the maximum allowed number of candidates for an inter-prediction candidate list, i.e., a merging candidate list and/or an AMVP candidate list, may be fixed by the video coding standard such that the decoder knows the maximum allowed number of candidates without need for any signaling in the encoded bit stream. In some embodiments, the maximum allowed number of candidates for an inter-prediction candidate list, i.e., a merging candidate list and/or an AMVP candidate list, may be signaled in the encoded bit stream. For example, a maximum allowed number of candidates for an inter-prediction candidate list may be signaled for each slice in a picture. Further, the entropy decoding component 700 decodes a candidate index based on the maximum allowed number of candidates for the corresponding inter-prediction candidate list. That is, a candidate index is de-binarized using truncated unary decoding in which the maximum allowed number of candidates for the corresponding candidate list is used as the maximum codeword size, i.e., truncated value.

If skip mode is indicated, the entropy decoding component 700 constructs a merging candidate list for the CU to be decoded. Construction of the merging candidate list is performed in an identical fashion to construction of the merging candidate list in the encoder and according to the same maximum allowed number of candidates used in the encoder. Unless the maximum allowed number of candidates is one, the entropy decoding component 700 decodes an index into the merging candidate list from the encoded bit stream. If the maximum size is one, the index is inferred to be 0. The entropy decoding component 700 provides the motion vector(s) from the merging candidate in the merging candidate list indicated by the index to the motion compensation component 710.

For each inter-predicted PU in a CU that is not coded using skip mode, the entropy decoding component 700 decodes a merge flag from the bit stream. If the merge flag indicates that merge mode was not selected for the PU, the entropy decoding component 700 constructs an AMVP candidate list (or lists) for the PU. Construction of the AMVP candidate list is performed in an identical fashion to construction of the AMVP candidate list in the encoder and according to the same maximum allowed number of candidates used in the encoder. The entropy decoding component 700 also decodes a reference picture index (or indices) and MVDs for the PU. Unless the maximum allowed number of candidates is one, the entropy decoding component 700 decodes an index (or indices) into the AMVP candidate list(s) from the encoded bit stream. If the maximum allowed number of candidates is one, the index (or indices) is inferred to be 0. The entropy decoding component 700 then reconstructs the motion vector(s) according to the MVP candidate(s) in the AMVP candidate list(s) indicated by the index (or indices) and the decoded MVDs and provides the motion vector(s) to the motion compensation component 710.

If the merge flag indicates that merge mode was used for the PU in the encoder, the entropy decoding component 700 constructs a merging candidate list for the PU. Construction of the merging candidate list is performed in an identical fashion to construction of the merging candidate list in the encoder and according to the same maximum allowed number of candidates used in the encoder. Unless the maximum size is one, the entropy decoding component 700 decodes an index into the merging candidate list from the encoded bit stream. If the maximum allowed number of candidates is one, the index is inferred to be 0. The entropy decoding component 700 provides the motion vector(s) from the merging candidate in the merging candidate list indicated by the index to the motion compensation component 710.

The inverse quantization component 702 de-quantizes the quantized transform coefficients of the residual PUs. The inverse transform component 704 transforms the frequency domain data from the inverse quantization component 702 back to residual PUs. That is, the inverse transform component 704 applies an inverse unit transform, i.e., the inverse of the unit transform used for encoding, to the de-quantized residual coefficients to produce the residual PUs.

A residual PU supplies one input of the addition component 706. The other input of the addition component 706 comes from the mode switch 708. When an inter-prediction mode is signaled in the encoded video stream, the mode switch 708 selects a PU from the motion compensation component 710 and when an intra-prediction mode is signaled, the mode switch selects a PU from the intra-prediction component 714.

The motion compensation component 710 receives reference data from storage 712 and applies the motion compensation computed by the encoder and transmitted in the encoded video bit stream to the reference data to generate a predicted PU. That is, the motion compensation component 710 uses the motion vector(s) from the entropy decoder 700 and the reference data to generate a predicted PU.

The intra-prediction component 714 receives reference data from previously decoded PUs of a current picture from the picture storage and applies the intra-prediction computed by the encoder as signaled by the intra-prediction mode transmitted in the encoded video bit stream to the reference data to generate a predicted PU.

The addition component 706 generates a decoded PU by adding the predicted PU selected by the mode switch 708 and the residual PU. The output of the addition component 706 supplies the input of the in-loop filters component 716. The in-loop filter component 716 performs the same filtering as the encoder. The output of the in-loop filter component 716 is the decoded pictures of the video bit stream. Further, the output of the in-loop filters component 716 is stored in storage 712 to be used as reference data.

FIG. 8 is a flow diagram of a method for construction of an AMVP candidate list for a PU given a maximum allowed number of MVP candidates allowed for the list. As has been previously discussed, the maximum allowed number of MVP candidates may be known a priori or may be selected by an encoder. This method may be used in an encoder or a decoder.

Initially, the AMVP candidate list is derived 800 to determine native MVP candidates, if any. This derivation is performed using motion data positions and derivation process for native MVP candidates as specified by the video coding standard. In an embodiment, the motion data positions and derivation process of WD3 may used. In other embodiments, the motion data positions and derivation process of other, later versions of HEVC may be used, e.g., WD4, WD5, HEVC Draft 6, and HEVC Draft 7.

If the number of native MVP candidates is greater than the maximum allowed number of MVP candidates allowed 802, the number of MVP candidates in the AMVP candidate list is reduced 804 to the maximum allowed number. This reduction may be performed by removing a sufficient number of MVP candidates from the list to reduce the number of candidates to the maximum allowed number. For example, if there are three MVP candidates in the AMVP candidate list and the maximum allowed number of candidates is two, one MVP candidate is removed from the list. The criteria used to select the MVP candidate(s) to be removed are specified by the video coding standard and may be any suitable criteria.

In some embodiments, the MVP candidates are arranged in the MVP candidate list in a priority order during the derivation process. To reduce the size of the MVP candidate list, MVP candidates are removed beginning with the lowest priority candidate and moving backward through the prioritized list until the desired list size is reached. This is illustrated in the example of FIG. 9A. In this example, the maximum allowed number of MVP candidates is two and the number of valid MVP candidates in the AMVP candidate list after the derivation process is 3. Further, the MVP candidates are in a priority order. For purposes of this example, 1 represents the highest priority and 3 represents the lowest priority. Because the number of native MVP candidates in the AMVP candidate list after the derivation process is 3, which is greater than the maximum allowed number of candidates, the lowest priority MVP candidate, the candidate in position 3 in the list, is removed from the list to generate the final AMVP candidate list. Note that if the maximum allowed number of MVP candidates is 1, the two lowest priority MVP candidates, the candidates in positions 3 and 2, are removed from the list to generate the final AMVP candidate list.

Referring again to FIG. 8, if the number of native MVP candidates is not greater than the maximum allowed number of MVP candidates 802, then virtual MVP candidates are added 806 to the AVMP candidate list, if needed, to generate a final AMVP candidate list with the maximum allowed number of MVP candidates. More specifically, if the number of MVP candidates in the AMVP candidate list is equal to the maximum allowed number after the derivation process, no virtual MVP candidates are added to generate the final AMVP candidate list. However, if the number of MVP candidates in the AMVP candidate list is less than the maximum allowed number, sufficient virtual MVP candidates are added to the AMVP candidate list to increase the size to the maximum allowed number.

The content of a virtual MVP candidate is specified by the video coding standard and may be have any suitable content that is known to both the encoder and the decoder. In some embodiments, a virtual MVP candidate is a zero MVP candidate. As previously discussed, a native MVP candidate is a motion vector from a motion data position considered during the derivation process. A zero MVP candidate is an MVP candidate in which the motion vector value is set to 0.

Further, the virtual MVP candidate(s) may be added to the AMVP candidate list at a position(s) specified by the video coding standard.

In some embodiments, the native MVP candidates are arranged in the MVP candidate list in a priority order during the derivation process. To increase the size of the MVP candidate list to the maximum allowed number, sufficient virtual MVP candidates are appended to the end of the AMVP candidate list. This is illustrated in the example of FIG. 9B. In this example, the maximum allowable number of MVP candidates is two and the number of valid native MVP candidates in the AMVP candidate list after the derivation process is 1. Because the number of native MVP candidates from the derivation process is 1, which is less than the maximum allowable number of candidates, a virtual MVP candidate is appended to the AMVP candidate list to generate the final AMVP candidate list. Note that if there are no native MVP candidates in the list after the derivation process, two virtual MVP candidates are added to the list to generate the final AMVP candidate list.

Figure 10:
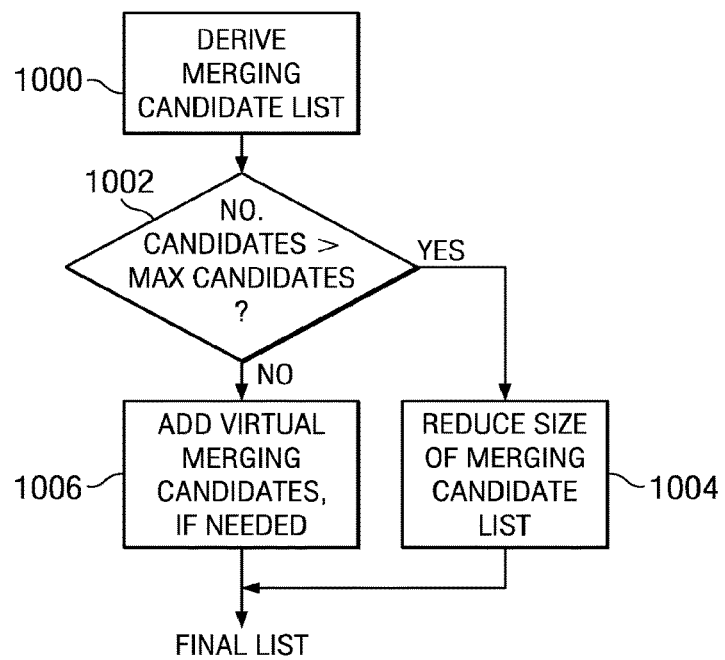
FIG. 10 is a flow diagram of a method for merging candidate list construction.

FIG. 10 is a flow diagram of a method for construction of a merging candidate list for a PU given a maximum allowed number of merging candidates allowed for the list. As has been previously discussed, the maximum allowed number of merging candidates may be known a priori or may be selected by an encoder. This method may be used in an encoder and a decoder. Also, the method may be used to construct a merging candidate list for skip mode at the CU level.

Initially, the merging candidate list is derived 1000 to determine native merging candidates, if any. This derivation is performed using motion data positions and derivation process for native merging candidates as specified by the video coding standard. In an embodiment, the motion data positions and derivation process of WD3 may used. In other embodiments, the motion data positions and derivation process of other, later versions of HEVC may be used, e.g., WD4, WD5, HEVC Draft 6, and HEVC Draft 7.

If the number of native merging candidates is greater than the maximum allowed number of merging candidates allowed 1002, the number of merging candidates in the merging candidate list is reduced 804 to the maximum allowed number. This reduction may be performed by removing a sufficient number of merging candidates from the list to reduce the number of candidates to the maximum allowed number. For example, if there are five merging candidates in the merging candidate list and the maximum allowed number of candidates is three, two merging candidates are removed from the list. The criteria used to select the merging candidate(s) to be removed are specified by the video coding standard and may be any suitable criteria.

Figure 11A:
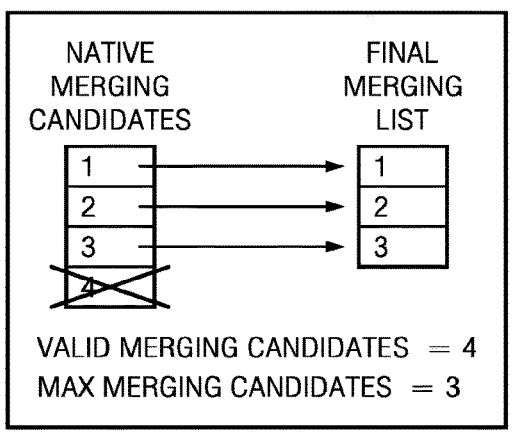
FIGS. 11A and 11B show examples of merging candidate list construction.

In some embodiments, the native merging candidates are arranged in the merging candidate list in a priority order during the derivation process. To reduce the size of the merging candidate list, merging candidates are removed beginning with the lowest priority candidate and moving backward through the prioritized list until the desired list size is reached. This is illustrated in the example of FIG. 11A. In this example, the maximum allowable number of merging candidates is three and the number of valid native merging candidates in the merging candidate list after the derivation process is 4. Further, the merging candidates are in a priority order. For purposes of this example, 1 represents the highest priority and 4 represents the lowest priority. Because the number of native merging candidates in the merging candidate list after the derivation process is 4, which is greater than the maximum allowable number of candidates, the lowest priority merging candidate, the candidate in position 4 in the list, is removed from the list to generate the final merging candidate list. Note that if the maximum allowed number of merging candidates is 2, the two lowest priority merging candidates, the candidates in positions 4 and 3, are removed from the list to generate the final merging candidate list.

Referring again to FIG. 10, if the number of native merging candidates is not greater than the maximum allowed number of merging candidates allowed 1002, then virtual merging candidates are added 1006 to the merging candidate list, if needed, to generate a final merging candidate list with the maximum allowed number of merging candidates. More specifically, if the number of native merging candidates in the merging candidate list is equal to the maximum allowed number after the derivation process, no virtual merging candidates are added to generate the final merging candidate list. However, if the number of merging candidates in the merging candidate list is less than the maximum allowed number, sufficient virtual merging candidates are added to the merging candidate list to increase the number of merging candidates to the maximum allowed number.

Figure 11B:
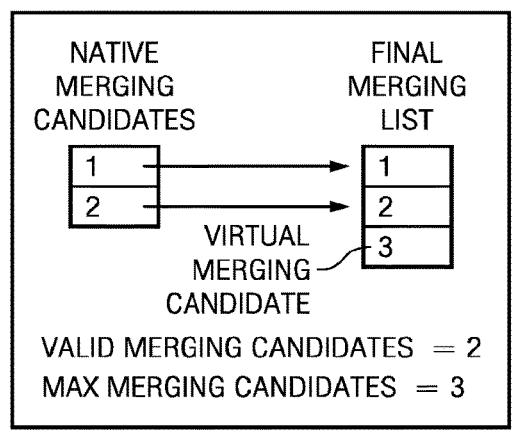

The content of a virtual merging candidate is specified by the video coding standard and may be have any suitable content that is known to both the encoder and the decoder. Further, the virtual merging candidate(s) may be added to the merging candidate list at a position(s) specified by the video coding standard. In some embodiments, the merging candidates are arranged in the merging candidate list in a priority order during the derivation process. To increase the size of the merging candidate list to the maximum allowed number, sufficient virtual merging candidates are appended to the end of the merging candidate list. This is illustrated in the example of FIG. 11B. In this example, the maximum allowable number of merging candidates is three and the number of valid native merging candidates in the merging candidate list after the derivation process is two. Because the number of native MVP candidates from the derivation process is three, which is less than the maximum allowable number of candidates, a virtual merging candidate is appended to the merging candidate list to generate the final merging candidate list. Note that if there are no native merging candidates in the list after the derivation process, three virtual merging candidates are added to the list to generate the final merging candidate list.

In some embodiments, a virtual merging candidate may be a zero motion vector merging candidate. As previously discussed, a native merging candidate includes motion vector information, prediction list utilization flag information, and reference picture index information for a motion data position considered during the derivation process and includes sufficient entries to accommodate a bi-directionally predicted PU. A zero motion vector merging candidate may include the same number of entries as a merging candidate and may be formatted as follows. In some embodiments, if the current slice, i.e., the slice containing the current PU, is a forward predicted slice, i.e., a P-slice, the zero motion vector merging candidate is formatted as follows: the prediction list utilization flag is set to indicate forward prediction, the forward motion vector is set to zero, and the forward reference picture index is set to zero. The remaining entries may set to any suitable placeholder value or may also be set to zero. In some embodiments, the forward prediction list utilization flag of the prediction list utilization flag entry is set to 1 and the backward prediction list utilization flag is set to 0 to indicate forward prediction. Other values for these flags may be used as long as the combination of values is distinct from that used to indicate bi-directional prediction or backward prediction.

In some embodiments, if the current slice is a bi-directionally predicted slice, i.e., a B-slice, the zero motion vector merging candidate is formatted as follows: the prediction list utilization flag is set to indicate bidirectional prediction, the forward motion vector and the backward motion vector are set to zero, and the forward and backward reference picture indices are set to zero. In some embodiments, the prediction utilization flags of the prediction list utilization flag entry are both set to 1 to indicate bi-directional prediction. Other values for these flags may be used as long as the combination of values is distinct from that used to indicate forward prediction or backward prediction.

In some embodiments, the value of the reference picture index or indices in a zero motion vector merging candidate depends on how many zero motion vector merging candidates are in a merging candidate list and how many reference pictures are in the reference picture list or lists. More specifically, for a PU in a P-slice, the kth zero vector merging candidate ($0 \leq k <$ maximum allowed number of merging candidates) in a merging candidate list will have a forward reference picture index value of k, if k is less than the number of active reference pictures in the forward reference picture list; otherwise, the reference picture index is set to 0. For example, if there are two zero motion vector merging candidates in a merging candidate list and at least two active reference pictures in the forward reference picture list, the first zero motion vector merging candidate will have a reference picture index value of 0 and the second zero motion vector merging candidate will have a reference picture index value of 1. For a PU in B-slice, the kth zero motion vector merging candidate in a merging candidate list have both a forward reference picture index value of k and a backward reference picture value of k, if k is less than the minimum of the number of active reference pictures in the forward reference picture list and the number of active reference pictures in backward reference picture list; otherwise, the reference picture indices are set to 0. For example, if there are two zero motion vector merging candidates in a merging candidate list and at least two active reference pictures in each of the forward reference picture list and the backward reference picture list, the reference picture indices in the first zero motion vector merging candidate will have a value of 0 and the reference picture indices in the second zero motion vector merging candidate will have a value of 1.

In some embodiments, if a PU is in a bi-directionally predicted slice, a virtual merging candidate may be a combined bi-predictive merging candidate. A combined bi-predictive merging candidate is a merging candidate in which the prediction list utilization flag is set to indicate bi-directional prediction and the motion vectors and reference picture indices are formed by combining a forward motion vector and a forward reference picture index of a native merging candidate in a merging candidate list with a backward motion vector and a backward reference picture index from another native merging candidate in the merging candidate list according to a pre-defined combination priority order. Said another way, native merging candidates in a merging candidate list can be combined to create combined bi-predictive merging candidates in a pre-defined combination priority order provided that a combined bi-predictive merging candidate has different reference pictures or different motion vectors in the forward and backward direction, i.e., for L0 and L1.

The pre-defined combination order for combined bi-predictive merging candidates is specified by the video coding standard. Tables 3 and 4 show an example of a pre-defined combination order when maximum possible number of native merging candidates is five. Table 3 provides an identifier for each forward component (L0 component) and backward component (L1 component) of a merging candidate for each possible index value. For example, the forward component for the merging candidate at index 0 in a merging candidate list is MVf0 and the backward component is MVb0. A forward component includes both the forward motion vector and the forward reference index and a backward component includes both the backward motion vector and the backward reference index.

The rules used for deciding the priorities in Table 4 are as follows. For combined candidates (MVfi, MVbj), where i and j are in the range of [0: maximum allowed number of merging candidates minus 1]: a) if two combined candidates have different values of i+j, the one with smaller value of i+j has higher priority; b) otherwise, if two combined merging candidates have a same value of i+j, the combined candidate with the smaller absolute different between i and j has higher priority; c) otherwise, if two combined candidates have a same value of i+j, and a same absolute different between i and j, the combined candidate with smaller value of i has higher priority.

Table 4 shows the possible combinations of forward and backward components of Table 3 for forming a combined candidate and the priority order for adding each combined candidate to a merging candidate list. For example, the highest priority combination combines the forward component of the native merging candidate at index 0, MVf0, and the backward component of the native merging candidate at index 1, MVb1, to create a combined merging candidate. The fifth priority combination combines the forward component of the native merging candidate at index 1, MVf1, and the backward component of the native merging candidate at index 2, MVb2, to create a combined merging candidate.

TABLE 3

| Merging candidate index | Merging candidate L0 component | Merging candidate L1 component |
|---|---|---|
| 0 | MVf0 | MVb0 |
| 1 | MVf1 | MVb1 |
| 2 | MVf2 | MVb2 |
| 3 | MVf3 | MVb3 |
| 4 | MVf4 | MVb4 |

TABLE 4

| Priority index | 0 | 1 | 2 | 3 |
|---|---|---|---|---|
| Combination | (MVf0, MVb1) | (MVf1, MVb0) | (MVf0, MVb2) | (MVf2, MVb0) |
| Priority index | 4 | 5 | 6 | 7 |
| Combination | (MVf1, MVb2) | (MVf2, MVb1) | (MVf0, MVb3) | (MVf3, MVb0) |
| Priority index | 8 | 9 | 10 | 11 |
| Combination | (MVf1, MVb3) | (MVf3, MVb1) | (MVf2, MVb3) | (MVf3, MVb2) |

TABLE 4-continued

| Priority index | 12 | 13 | 14 | 15 |
|---|---|---|---|---|
| Combination | (MVf0, MVb4) | (MVf4, MVb0) | (MVf1, MVb4) | (MVf4, MVb1) |
| Priority index | 16 | 17 | 18 | 19 |
| Combination | (MVf2, MVb4) | (MVf4, MVb2) | (MVf3, MVb4) | (MVf4, MVb3) |

All of the possible combinations in Table 4 may not be available for any given merging candidate list. When the native merging candidates are derived for a PU in a bi-directionally predicted slice, it is possible that either the forward or backward component of a native merging candidate may not be available. If a forward or backward component of a native merging candidate is not available, then any combinations in Table 4 that include the unavailable component are also not available for addition to the merging candidate list. Table 5 shows an example of available components for each candidate index after derivation of the native merging candidates. Note that MVb0, MVf2, and MVb3 are not available. Also note that only four native merging candidates are in the merging candidate list so MVf4 and MVb4 are also not available. Accordingly, should there be a need to add virtual merging candidates to the merging candidate list, any of the combinations in Table 4 that include MVb0, MVf2, MVb3, MVf4, and MVb4 will not be available, i.e., the combinations at priority indices 1, 3, 5-8, 10, and 12-19.

TABLE 5

| Merging candidate index | Merging candidate L0 component | Merging candidate L1 component |
|---|---|---|
| 0 | MVf0 | N/A |
| 1 | MVf1 | MVb1 |
| 2 | N/A | MVb2 |
| 3 | MVf3 | N/A |
| 4 | | |

In some embodiments, when a PU is in a bi-directionally predicted slice, virtual merging candidates are added to a merging candidate list to attain the maximum allowed number of merging candidates as follows. First, available combined merging candidates are considered for addition to the list in priority order. If there are not sufficient available combined merging candidates to generate a merging candidate list with the maximum allowed number of merging candidates, then sufficient zero motion vector merging candidates are appended to the list to attain the maximum allowed number. This illustrated by the example of Tables 6 and 7 and the example of Tables 8 and 9. These examples assume that the maximum allowed number of merging candidates for a merging candidate list is five.

Table 6 shows the content of a merging candidate list for a PU of a bi-predicted slice after the native merging candidates are derived. Note that the backward component of the merging candidate at index 0, MVb0, and the forward component of the merging candidate at index 1, MVf1, are not available. To generate a merging candidate list with five merging candidates, two virtual candidates need to be appended to the list at indices 3 and 4. The available combined candidates for addition to the merging list, in priority order from Table 4, are (MVf0, MVb1), (MVf0, MVb2), and (MVf2, MVb1). The first two of these available combined candidates are appended to the merging candidate list at indices 3 and 4 in priority order as shown in Table 7. There is no need to add zero motion vector merging candidates as there were sufficient available combined candidates to complete the merging candidate list.

Table 8 shows the content of a merging candidate list for a PU of a bi-predicted slice after the native merging candidates are derived. Note that the backward component of the merging candidate at index 0, MVb0, and the forward component of the merging candidate at index 1, MVf1, are not available. To generate a merging candidate list with five merging candidates, three virtual candidates need to be appended to the list at indices 2, 3 and 4. The only available combined candidate for addition to the merging list from Table 4 is (MVf0, MVb1). This combined candidate is appended to the merging candidate list at index 2. As there are no other available combined candidates, two zero motion vector merging candidates are appended to the merging candidate list at indices 3 and 4 to complete the list. The final merging candidate list is shown in Table 9. In some embodiments, the motion vectors and reference picture indices for both the forward and backward components of the two zero motion vector merging candidates are all 0. In some embodiments, the reference picture indices for the first zero motion vector merging candidate are both 0, and the reference picture indices for the second zero motion vector merging candidate are both 1, if both reference picture lists have at least two active reference pictures. If either one of the reference picture lists has less than two active reference pictures, the reference picture indices will be 0 in both zero motion vector merging candidates.

TABLE 6

| Merging candidate index | Merging candidate L0 component | Merging candidate L1 component |
|---|---|---|
| 0 | MVf0 | N/A |
| 1 | N/A | MVb1 |
| 2 | MVf2 | MVb2 |

TABLE 7

| Merging candidate index | Merging candidate L0 component | Merging candidate L1 component |
|---|---|---|
| 0 | MVf0 | N/A |
| 1 | N/A | MVb1 |
| 2 | MVf2 | MVb2 |
| 3 | MVf0 | MVb1 |
| 4 | MVf0 | MVb2 |

TABLE 8

| Merging candidate index | Merging candidate L0 component | Merging candidate L1 component |
|---|---|---|
| 0 | MVf0 | N/A |
| 1 | N/A | MVb1 |

TABLE 9

| Merging candidate index | Merging candidate L0 component | Merging candidate L1 component |
|---|---|---|
| 0 | MVf0 | N/A |
| 1 | N/A | MVb1 |
| 2 | MVf0 | MVb1 |
| 3 | zerof | zerob |
| 4 | zerof | zerob |

Figure 12:
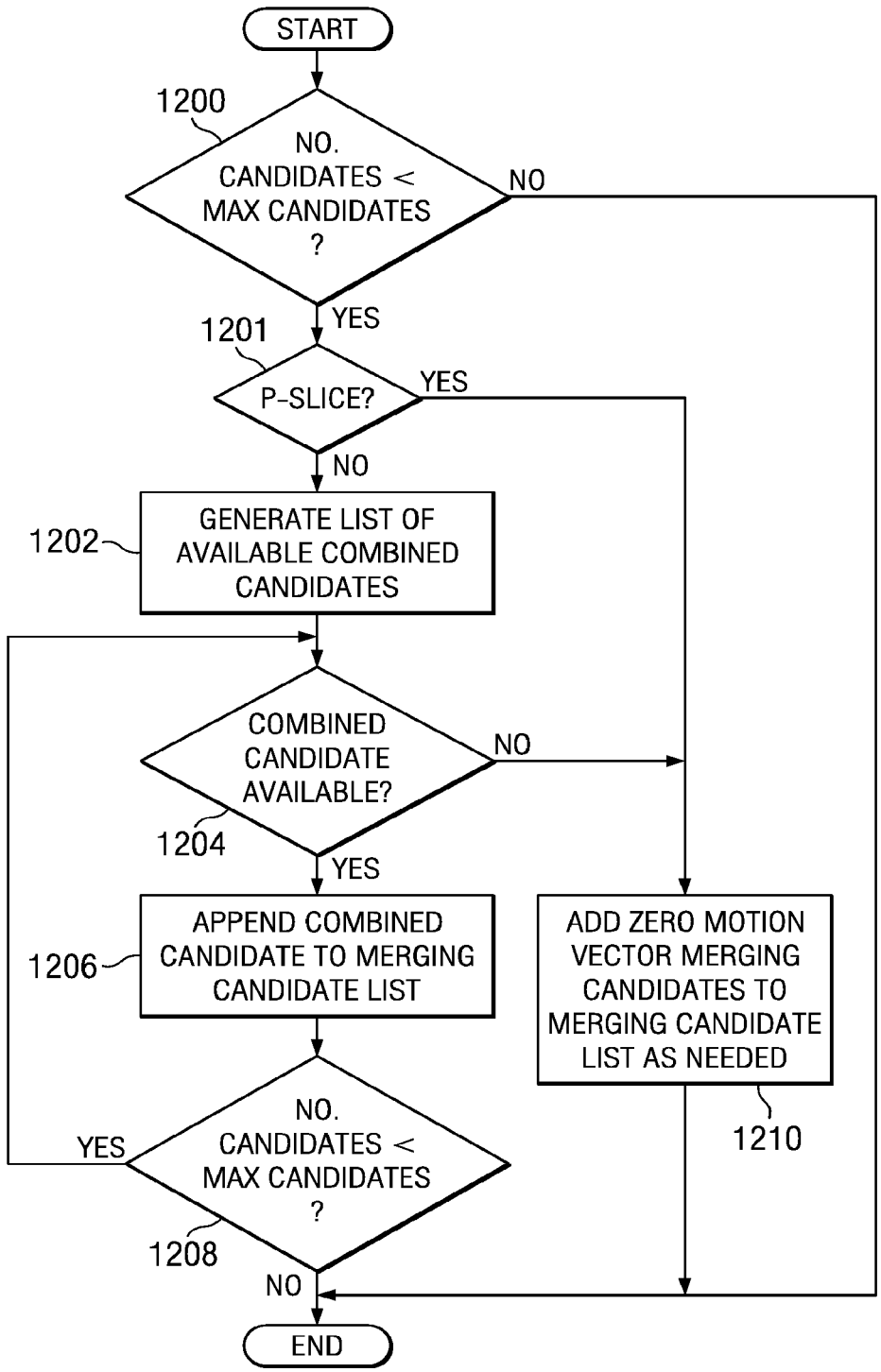
FIG. 12 is a flow diagram of a method for adding virtual merging candidates to a merging candidate list during merging candidate list construction.

FIG. 12 is a flow diagram of a method for adding virtual merging candidates to a merging candidate list for a PU given a maximum allowed number of merging candidates allowed for the list. This method may be used in an encoder and a decoder. This method is used after the derivation of the native merging candidates (if any) for the PU. This method may also be used in the construction of a merging candidate list for skip mode at the CU level. This method is explained assuming that the maximum possible number of native merging candidates is five and assuming the pre-defined prioritized combination order for combined merging candidates of Table 4. One of ordinary skill in the art, having benefit of this description, will understand embodiments in which the maximum possible number of native merging candidates and/or the predefined prioritized combination order for combined merging candidates differs.

Initially, a check is made to determine if the number of merging candidates in the merging candidate list is less than the maximum allowed number 1200. Note that at this point, any merging candidates in the merging candidate list are native merging candidates. If the number of merging candidates is not less than the maximum allowed number, the method terminates as the list has the maximum allowed number of merging candidates. If the number of merging candidates is less than the maximum allowed number and the PU is in a P-slice 1201, then a sufficient number of zero motion vector merging candidates are added 1210 to the merging candidate list to attain the maximum allowed number of merging candidates needed and the method terminates.

If the number of merging candidates is less than the maximum allowed number and the PU is in a B-slice 1201, an ordered list of available combined candidates is generated 1202. As previously mentioned, if a forward or backward component of a native merging candidate in a merging candidate list is not available, any combined candidates of Table 4 that include the unavailable component are also not available. The available combined candidates are ordered in the list according to the priority order of Table 4. For example, in the example of Tables 6 and 7, the list of available combined candidates would be {(MVf0, MVb1), (MVf0, MVb2), (MVf2, MVb1)} and in the example of Tables 8 and 9, the list of available combined candidates would be {(MVf0, MVb1)}.

A check is then made to determine if a combined candidate is available 1204. A combined candidate is available if the combined candidate list is not empty. If the list is not empty, the combined candidate in the list with the highest priority is appended 1206 to the merging candidate list and is removed from the available combined candidate list. For example, in the example of Tables 6 and 7, in the first iteration, (MVf0, MVb1) would be added to the merging candidate list. The check for an available combined candidate 1204, and appending an available combined candidate to the margining candidate list 1206 (with removal of the appended combined candidate from the available combined candidate list) are repeated until either the merging candidate list has the maximum allowed number of merging candidates 1208 or the combined candidate list is empty 1204.

If the combined candidate list becomes empty 1204 before a sufficient number of combined candidates are added to the merging candidate list to reach the maximum allowed number, a sufficient number of zero motion vector merging candidates are added 1210 to the merging candidate list to attain the maximum allowed number of merging candidates needed. For example, in the example of Tables 8 and 9, since there is only one available combined candidate, and three virtual candidates are need to complete merging candidate list, two zero motion vector merging candidates are added to the merging candidate list to complete the list.

Figure 13:
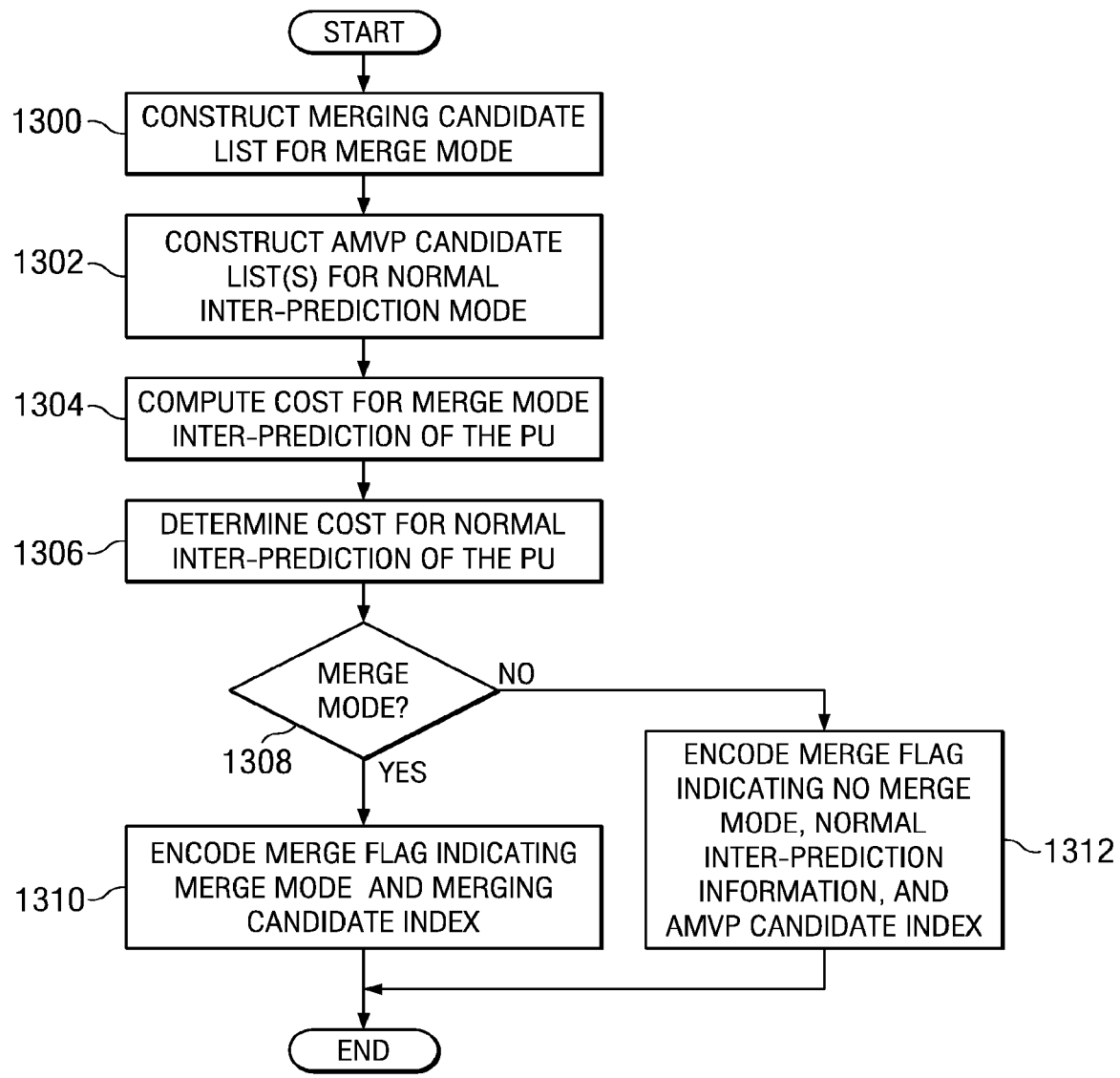
FIG. 13 is a flow diagram of a method for encoding an inter-predicted PU
Figure 14:
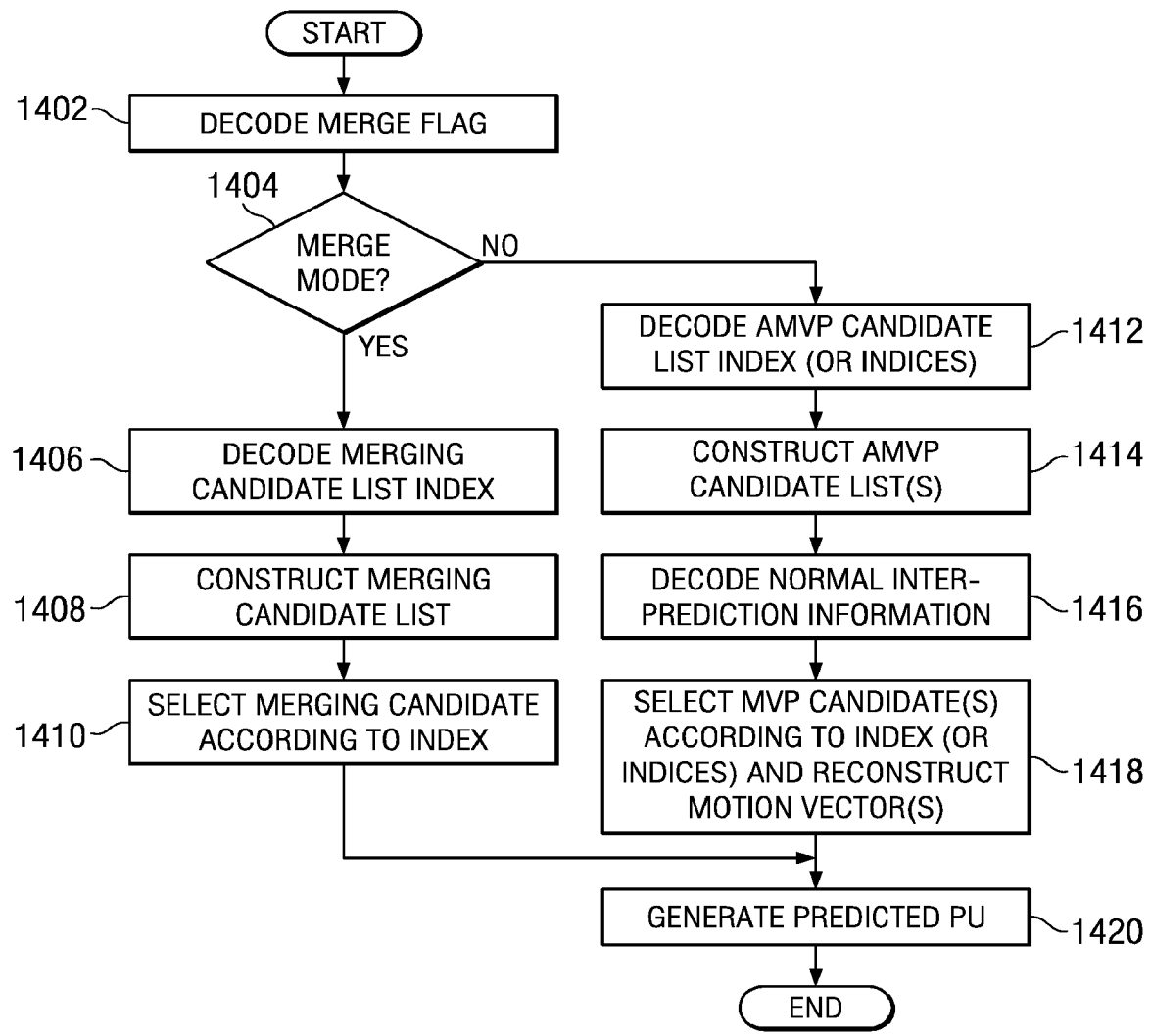
FIG. 14 is a flow diagram of a method for decoding an inter-predicted PU.

FIG. 13 shows a flow diagram illustrating a method for inter-prediction of a PU in a video encoder and FIG. 14 shows a flow diagram illustrating a method for decoding an inter-predicted PU in a video decoder. Referring first to FIG. 13, initially, a merging candidate list with a maximum allowed number of merging candidates is constructed 1300 for the PU as part of motion estimation in the video encoder. The construction of the merging candidate list may be performed as per an embodiment of the method of FIG. 10. In some embodiments, the maximum allowed number of merging candidates for the merging candidate list may be determined by the encoder at the slice level. In some such embodiments, the encoder may select a maximum allowed number in the range of 1 to 5, inclusive. In some embodiments, the maximum allowed number of merging candidates in a merging candidate list may be specified by the video coding standard.

An AMVP candidate list with a maximum allowed number of MVP candidates is constructed 1302 for the PU as part of motion estimation in the video encoder. The construction of the AMVP candidate list may be performed as per an embodiment of the method of FIG. 8. In some embodiments, the maximum allowed number of MVP candidates for the AMVP candidate may be determined by the encoder at the slice level. In some such embodiments, the encoder may select a maximum allowed number in the range of 1 to 3, inclusive. In some embodiments, the maximum allowed number of MVP candidates in an AMVP candidate list may be specified by the video coding standard. For example, the video coding standard may set the maximum allowed number to be 2.

The coding costs for merge mode inter-prediction 1304 and normal inter-prediction 1306 of the PU are then computed. More specifically, a coding cost is computed for each merging candidate in the merging candidate list is computed and the merging candidate providing the best result is selected for merge mode. Similarly, a coding cost is computed for each MVP candidate in the AMVP candidate list is computed and the MVP candidate providing the best result is selected for normal inter-prediction mode. Computation of coding costs may be specified by the video coding standard in use.

A determination 1308 is made as to whether or not merge mode is to be used for prediction of the PU. Merge mode is used if it provides the best coding cost as compared to normal inter-prediction and intra-prediction. If merge mode is selected 1308, a merge flag is encoded 1310 in the encoded bit stream with a value indicating that merge mode was used for the PU. The index of the merging candidate in the merging candidate list used for predicting the PU is also encoded in the encoded bit stream unless the merge merging candidate list size is one. The merging candidate index is encoded based on the maximum allowed number of merging candidates for a merging candidate list. More specifically, as part of encoding the merging candidate index, the index is binarized using truncated unary encoding in which the maximum allowed number of merging candidates is used as the maximum codeword size.

If merge mode is not selected 1308 (and the PU is inter-predicted), the merge flag is encoded 1312 in the encoded bit stream with a value indicating that merge mode was not used for the PU along with the normal inter-prediction information for the PU. The index of the merging candidate in the merging candidate list used for predicting the PU is also encoded in the encoded bit stream unless the merge merging candidate list size is one. The AMVP candidate index is encoded based on the maximum allowed number of MVP candidates for an AMVP candidate list. More specifically, as part of encoding the AMVP candidate index, the index is binarized using truncated unary encoding in which the maximum allowed number of MVP candidates is used as the maximum codeword size.

Referring now to FIG. 14, to decode an inter-predicted PU, initially the merge flag for the PU is decoded 1402 from the encoded bit stream. A determination 1404 is then made as to whether or not merge mode was used to predict the PU. If merge mode is indicated 1404, a merging candidate index (if present) is decoded from the encoded bit stream. The merging candidate index is decoded based on a maximum allowed number of merging candidates for a merging candidate list. More specifically, as part of decoding the merging candidate index, the index is de-binarized using truncated unary decoding in which the maximum allowed number of merging candidates is used as the maximum codeword size. In some embodiments, the maximum allowed number of merging candidates for the merging candidate may be determined by the encoder at the slice level and encoded in the encoded bit stream. In such embodiments, an indicator of the maximum allowed number of merging candidates is decoded for each inter-predicted slice. In some such embodiments, the encoder may select a maximum allowed number in the range of 1 to 5, inclusive. In some embodiments, the maximum allowed number of merging candidates in a merging candidate list may be specified by the video coding standard. Note that the decoder may use the maximum allowed number of merging candidates to determine whether or not a merging candidate index is encoded in the bit stream. If the maximum allowed number of merging candidates is one, the index is presumed to be 0.

A merging candidate list with the maximum allowed number of merging candidates is also constructed 1408 for the PU. The construction of the merging candidate list may be performed as per an embodiment of the method of FIG. 10. A merging candidate is then selected 1410 from the merging candidate list according to the merging candidate index. A predicted PU is then generated 1420 using the motion data in the merging candidate indicated by the index.

If merge mode is not indicated 1404, an AMVP candidate index (or indices) (if present) is decoded 1412 from the encoded bit stream. The AMVP candidate index (or indices) is decoded based on a maximum allowed number of MVP candidates for an AMVP candidate list. More specifically, as part of decoding the AMVP candidate index (or indices), the index (or indices) is de-binarized using truncated unary decoding in which the maximum allowed number of MVP candidates is used as the maximum codeword size. In some embodiments, the maximum allowed number of AMVP candidates for the AVMP candidate list may be determined by the encoder at the slice level and encoded in the encoded bit stream. In such embodiments, the maximum allowed number of MVP candidates is decoded for each inter-predicted slice. In some such embodiments, the encoder may select a maximum allowed number in the range of 1 to 3, inclusive. In some embodiments, the maximum allowed number of MVP candidates in an AMVP candidate list may be specified by the video coding standard. Note that the decoder may use the maximum allowed number of MVP candidates to determine whether or not an AMVP candidate index is encoded in the bit stream. If the maximum allowed number of MVP candidates is one, the index is presumed to be 0.

An AMVP candidate list(s) with the maximum allowed number of MVP candidates is also constructed 1414 for the PU. The construction of the AMVP candidate list(s) may be performed as per an embodiment of the method of FIG. 8. The normal inter-prediction information, e.g., MVD(s) and a reference picture index (or indices) is then decoded 1416 from the encoded bit stream. An MVP candidate(s) is selected 1418 from the AMVP candidate list(s) according to the AMVP candidate index (or indices) and the motion vector(s) for the PU are reconstructed from the selected MVP candidate(s). A predicted PU is then generated 1420 using the reconstructed motion vector(s).

Figure 15:
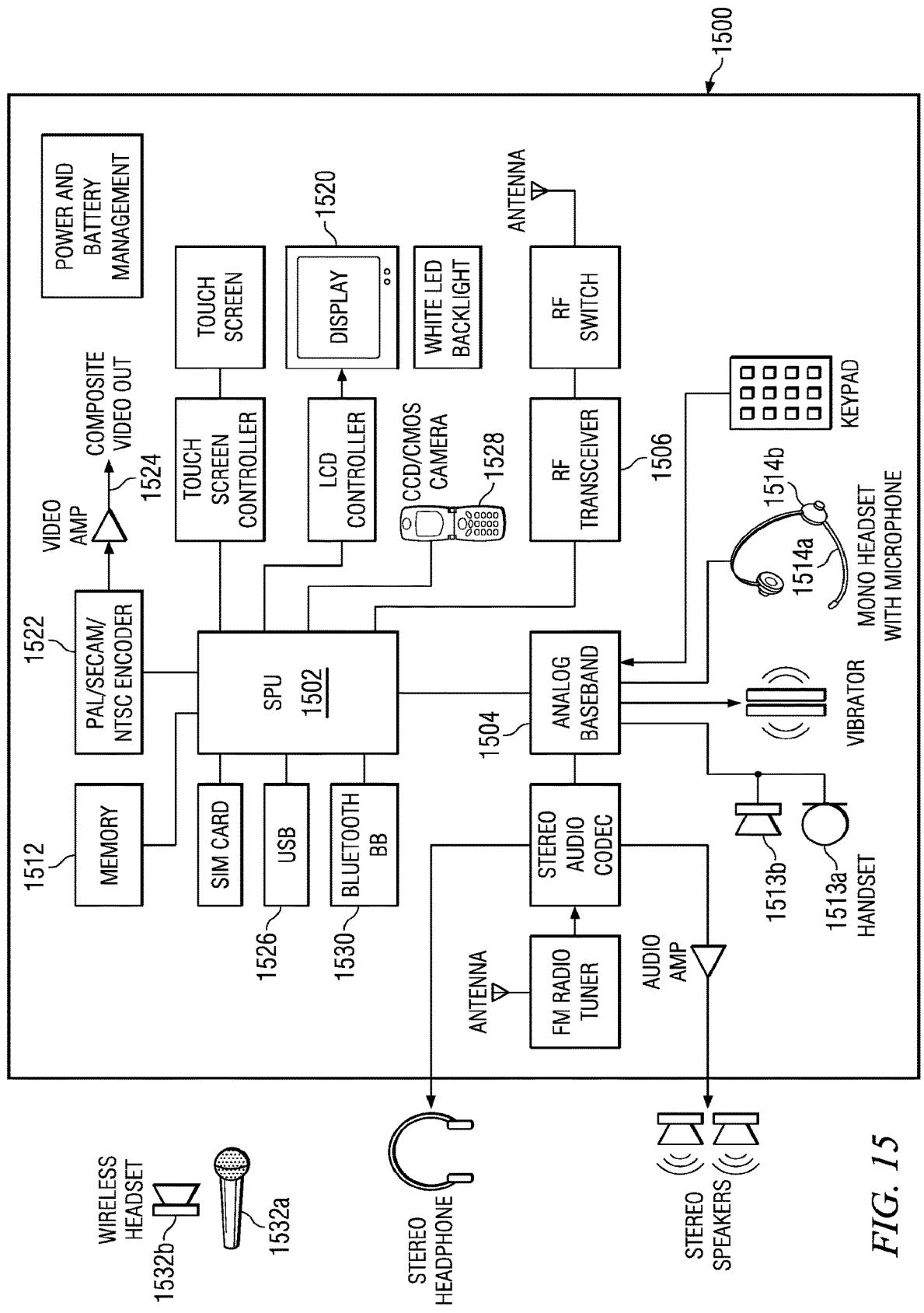
FIG. 15 is a block diagram of an illustrative digital system.

Embodiments of the methods, encoders, and decoders described herein may be implemented for virtually any type of digital system (e.g., a desk top computer, a laptop computer, a tablet computing device, a netbook computer, a handheld device such as a mobile (i.e., cellular) phone, a personal digital assistant, a digital camera, a set top box, a digital video recorder, etc.). FIG. 15 is a block diagram of a digital system 900 (e.g., a mobile cellular telephone) that may be configured to use techniques described herein.

As shown in FIG. 15, the signal processing unit (SPU) 1502 includes a digital signal processing system (DSP) that includes embedded memory and security features. The analog baseband unit 1504 receives a voice data stream from the handset microphone 1513*a* and sends a voice data stream to the handset mono speaker 1513*b*. The analog baseband unit 1504 also receives a voice data stream from the microphone 1514*a* or 1532*a* and sends a voice data stream to the mono headset 1514*b* or wireless headset 1532*b*. The analog baseband unit 1504 and the SPU 1502 may be separate ICs. In many embodiments, the analog baseband unit 1504 does not embed a programmable processor core, but performs processing based on configuration of audio paths, filters, gains, etc being setup by software running on the SPU 1502.

The display 1520 may display pictures and video sequences received from a local camera 1528, or from other sources such as the USB 1526 or the memory 1512. The SPU 1502 may also send a video sequence to the display 1520 that is received from various sources such as the cellular network via the RF transceiver 1506 or the Bluetooth interface 1530. The SPU 1502 may also send a video sequence to an external video display unit via the encoder unit 1522 over a composite output terminal 1524. The encoder unit 1522 may provide encoding according to PAL/SECAM/NTSC video standards.

The SPU 1502 includes functionality to perform the computational operations required for video encoding and decoding. In one or more embodiments, the SPU 1502 is configured to perform computational operations for applying one or more techniques for PU inter-prediction during the encoding process as described herein. Software instructions implementing all or part of the techniques may be stored in the memory 1512 and executed by the SPU 1502, for example, as part of encoding video sequences captured by the local camera 1528. The SPU 1502 is also configured to perform computational operations for applying one or more techniques for decoding of inter-predicted PUs as described herein as part of decoding a received coded video sequence or decoding a coded video sequence stored in the memory 1512. Software instructions implementing all or part of the techniques may be stored in the memory 1512 and executed by the SPU 1502.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, while embodiments have been described herein in which an inter-prediction candidate list is required to have the number of candidates specified by the associated maximum allowed number of candidates, one of ordinary skill in the art will understand embodiments in which the an inter-prediction candidate list may have any number of candidates up to the corresponding maximum allowed number of candidates. In other words, a candidate list may have fewer candidates than the maximum allowed number of candidates but is not allowed to have more candidates than the maximum allowed number of candidates. In such embodiments, the index for selected candidate may still be encoded according to the maximum allowed number of candidates.

In another example, embodiments are described herein in which the encoder may select the maximum size of an inter-prediction candidate list for each slice in a picture and signal the selected size to the decoder as part of the slice header information. In other embodiments, the encoder may select a maximum size at the sequence level, picture level, LCU level, slice level, and/or any combination thereof and signal the selected size at the appropriate point(s) in the encoded bit stream.

In some embodiments, context-adaptive variable length coding (CAVLC) may be used in entropy encoding instead of CABAC. In CAVLC, an inter-prediction candidate index may be variable length coded using truncated unary coding. Accordingly, the maximum size of an inter-prediction candidate list may be used as the maximum codeword size for truncated unary coding of the corresponding candidate index.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for decoding a picture from an encoded video bit stream, comprising:
   decoding the encoded video bit stream;
   extracting from the decoded video bit stream a maximum allowed number of merge candidates for a merge candidate list for a slice region comprising prediction units (PUs) wherein the maximum allowed number of merge candidates for the merge candidate list is the maximum allowed number of merge candidates for all the prediction units;
   determining a merge candidate index for a prediction unit (PU) in the slice region from the decoded video bit stream using the maximum allowed number of merge candidates in the slice region, wherein one less than the maximum allowed number of merge candidates is used as a maximum codeword size for truncated unary decoding of the merge candidate index;
   constructing a merge candidate list for the PU wherein the merge candidate list comprises the maximum allowed number of merge candidates; and
   reconstructing the PU using the merge candidate list for the PU and the merge candidate index for the PU.

2. The method of claim 1 wherein the PU is an inter-predicted PU.

3. The method of claim 2 further comprising:
   extracting from the decoded video bit stream a skip mode flag for the PU; and
   extracting from the decoded video bit stream a merge flag for the PU when skip mode is not indicated for the PU by the skip mode flag.

4. The method of claim 3 further comprising decoding the picture using the processed PU.

5. The method of claim 4 further comprising storing the picture in a memory.

6. A video system for decoding a picture from an encoded video bit stream, comprising:
   an entropy decoding component configured to:
      decode a maximum allowed number of merge candidates for a merge candidate list for a slice region of the picture comprising prediction units (PUs), wherein the maximum allowed number of merge candidates for the merge candidate list is the maximum allowed number of merge candidates for all the PUs;
      decode a merge candidate index for a prediction unit (PU) in the slice region using the maximum allowed number of merge candidates in the slice region wherein one less than the maximum allowed number of merge candidates is used as a maximum codeword size for truncated unary decoding of the merge candidate index;
      construct a merge candidate list for the PU wherein the merge candidate list comprises the maximum allowed number of merge candidates;
   an inverse quantization component coupled to the entropy decoding component and configured to de-quantize quantized transform coefficients of residual prediction units decoded from the encoded video bit stream;
   an inverse transform component coupled to the inverse quantization component and configured to inverse transform the de-quantized transform coefficients of residual prediction units from the inverse quantization component from a frequency domain to residual prediction units;
   a motion compensation component coupled to the entropy decoding component and configured to form reconstructed prediction units; and
   an adder component coupled to the motion compensation component and the inverse transform component and configured to combine residual prediction units and reconstructed prediction units.

7. The video system of claim 6 wherein the motion compensation component, the inverse transform component, the adder component, and the entropy decoding component are all implemented in a signal processing unit that comprises a digital signal processor (DSP) and embedded memory.

8. The video system of claim 6 wherein the entropy decoding component, the inverse quantization component, the inverse transform component, the motion compensation component, and the adder component are all implemented in a system comprising a software program being executed in one or more processors wherein the software program is stored in a memory and loaded from the memory into the one or more processors prior to being executed by the one or more processors.

9. The video system of claim 6 wherein the entropy decoding component, the inverse quantization component, the inverse transform component, the motion compensation component, and the adder component are all implemented in a signal processing unit that is further coupled to a memory.

10. The video system of claim 9 wherein the signal processing unit and the memory are further coupled to a display.

11. A video system for decoding a picture from an encoded video bit stream, comprising:
   an entropy decoding component configured to:
      decode a maximum allowed number of merge candidates for a merge candidate list for a slice region of the picture comprising prediction units (PUs), wherein the maximum allowed number of merge candidates for the merge candidate list is the maximum allowed number of merge candidates for all the prediction units;
      decode a merge candidate index for a prediction unit (PU) in the slice region using the maximum allowed number of merge candidates in the slice region wherein one less than the maximum allowed number of merge candidates is used as a maximum codeword size for truncated unary decoding of the merge candidate index;
      construct a merge candidate list for the PU wherein the merge candidate list comprises the maximum allowed number of merge candidates;
   an inverse quantization component coupled to the entropy decoding component and configured to de-quantize quantized transform coefficients of residual prediction units decoded from the encoded video bit stream;

an inverse transform component coupled to the inverse quantization component and configured to inverse transform the de-quantized transform coefficients of residual prediction units from the inverse quantization component from a frequency domain to residual prediction units;

a motion compensation component coupled to the entropy decoding component and configured to form reconstructed prediction units;

an adder component coupled to the motion compensation component and the inverse transform component and configured to combine residual prediction units and reconstructed prediction units;

a memory coupled to the adder component and configured to store the picture; and a display coupled to the memory to display the picture.

12. The video system of claim 11 wherein the motion compensation component, the inverse transform component, the adder component, and the entropy decoder component are all implemented in a signal processing unit that comprises a digital signal processor (DSP) and embedded memory.

13. The video system of claim 11 wherein the entropy decoding component, the inverse quantization component, the inverse transform component, the motion compensation component, and the adder component are all implemented in a system comprising a software program being executed in one or more processors wherein the software program is stored in a memory and loaded from the memory into the one or more processors prior to being executed by the one or more processors.

* * * * *